(12) United States Patent
Ooba

(10) Patent No.: US 11,049,287 B2
(45) Date of Patent: *Jun. 29, 2021

(54) SENSING SYSTEM, WORK SYSTEM, AUGMENTED-REALITY-IMAGE DISPLAYING METHOD, AND PROGRAM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/540,289

(22) Filed: Aug. 14, 2019

(65) Prior Publication Data

US 2020/0074692 A1   Mar. 5, 2020

(30) Foreign Application Priority Data

Aug. 31, 2018 (JP) .............................. JP2018-163819

(51) Int. Cl.
*G06T 11/00* (2006.01)
*G06T 7/70* (2017.01)
(Continued)

(52) U.S. Cl.
CPC .............. *G06T 11/00* (2013.01); *B25J 13/06* (2013.01); *G05B 19/4155* (2013.01);
(Continued)

(58) Field of Classification Search
CPC ...... B25J 9/0093; B25J 9/1697; B25J 9/0003; B25J 9/1664; B25J 9/023; B25J 9/1694;
(Continued)

(56) References Cited

U.S. PATENT DOCUMENTS 9,632,313 B1    4/2017   Madan et al.
2002/0105296 A1  8/2002   Okuyama et al.
(Continued)

FOREIGN PATENT DOCUMENTS

EP    1 522 911 A2    4/2005
EP    1 701 233 A2    9/2006
(Continued)

OTHER PUBLICATIONS

U.S. Appl. No. 16/451,668 Specification filed on Jun. 25, 2019; 79 pages.
(Continued)

*Primary Examiner* — Xuemei Zheng
(74) *Attorney, Agent, or Firm* — Maier & Maier, PLLC

(57) ABSTRACT

A sensing system provided with a target detecting unit which applies predetermined processing to data obtained by a detecting device and thereby detects a target object, the sensing system including an augmented-reality-image creating unit which creates an image corresponding to a candidate in a plurality of candidates that appear in the processed data to which the predetermined processing has been applied, a predetermined parameter of the candidate being equal to or greater than a detection threshold, and creates a candidate image corresponding to a candidate in the plurality of candidates, the predetermined parameter of the candidate for the candidate image is less than the detection threshold and equal to or greater than a detection candidate threshold, and a display device that displays the image and the candidate image.

15 Claims, 9 Drawing Sheets

(51) Int. Cl.
  *G06T 7/00* (2017.01)
  *B25J 13/06* (2006.01)
  *G05B 19/4155* (2006.01)
  *G06F 3/0484* (2013.01)
  *G06T 7/73* (2017.01)

(52) U.S. Cl.
  CPC ...... *G06F 3/04845* (2013.01); *G06F 3/04847* (2013.01); *G06T 7/0004* (2013.01); *G06T 7/70* (2017.01); *G06T 7/74* (2017.01); *G05B 2219/35499* (2013.01); *G06T 2200/24* (2013.01)

(58) Field of Classification Search
  CPC ....... B25J 13/08; B25J 13/06; G06T 7/70–75; G06T 19/006; G06T 19/20; G06T 7/0004; G06T 7/74; G06T 11/00; G06T 2200/24; G05B 2219/40099; G05B 2219/40123; G05B 2219/40409; G05B 2219/40411; G05B 19/4155; G05B 2219/35499; G05B 2219/39449
  See application file for complete search history.

(56) References Cited

U.S. PATENT DOCUMENTS

| | | | |
|---|---|---|---|
| 2004/0189631 A1 | 9/2004 | Kazi et al. | |
| 2005/0075752 A1 | 4/2005 | Ban et al. | |
| 2008/0301072 A1 | 12/2008 | Nagatsuka et al. | |
| 2012/0323363 A1 | 12/2012 | Izumi et al. | |
| 2014/0081459 A1 | 3/2014 | Dubois et al. | |
| 2014/0200714 A1* | 7/2014 | Kawamoto | B25J 13/08 700/257 |
| 2015/0231782 A1 | 8/2015 | Kawamoto et al. | |
| 2015/0246778 A1 | 9/2015 | Koga et al. | |
| 2015/0350618 A1 | 12/2015 | Meier et al. | |
| 2016/0075022 A1 | 3/2016 | Kawamoto et al. | |
| 2016/0158937 A1 | 6/2016 | Kamoi et al. | |
| 2017/0165841 A1 | 6/2017 | Kamoi | |
| 2018/0021951 A1 | 1/2018 | Kawamoto et al. | |
| 2018/0043541 A1* | 2/2018 | Shimamura | H04N 5/04 |
| 2018/0056335 A1 | 3/2018 | Ogusu et al. | |
| 2018/0056516 A1 | 3/2018 | Tsukamoto et al. | |
| 2018/0117766 A1 | 5/2018 | Atohira et al. | |
| 2018/0205892 A1 | 7/2018 | Kamimura et al. | |
| 2018/0218218 A1 | 8/2018 | Madan et al. | |
| 2018/0218538 A1* | 8/2018 | Short | G06T 7/73 |
| 2019/0105771 A1 | 4/2019 | Kawamoto et al. | |
| 2019/0126467 A1 | 5/2019 | Kawamoto et al. | |
| 2019/0156563 A1 | 5/2019 | Wada | |
| 2019/0308320 A1* | 10/2019 | Konishi | G06K 9/00208 |
| 2020/0030973 A1 | 1/2020 | Goto et al. | |
| 2020/0078951 A1 | 3/2020 | Kamoi | |

FOREIGN PATENT DOCUMENTS

| | | |
|---|---|---|
| EP | 1 768 006 A2 | 3/2007 |
| EP | 2 033 747 A2 | 3/2009 |
| EP | 2 537 645 A1 | 12/2012 |
| EP | 2 586 575 A1 | 5/2013 |
| EP | 2 586 576 A1 | 5/2013 |
| EP | 3 474 236 A1 | 4/2019 |
| JP | 2002-192486 A | 7/2002 |
| JP | 2004-243516 A | 9/2004 |
| JP | 2005-111607 A | 4/2005 |
| JP | 2008-296330 A | 12/2008 |
| JP | 2013-000861 A | 1/2013 |
| JP | 2013-031896 A | 2/2013 |
| JP | 2014-017026 A | 1/2014 |
| JP | 2015-214012 A | 12/2015 |
| JP | 2016-509394 A | 3/2016 |
| JP | 2016-107379 A | 6/2016 |
| JP | 2017-100206 A | 6/2017 |
| JP | 2017-100234 A | 6/2017 |
| JP | 2017-104944 A | 6/2017 |
| JP | 2018-034233 A | 3/2018 |
| JP | 2018-051653 A | 4/2018 |
| JP | 2018-051671 A | 4/2018 |
| JP | 2018-069377 A | 5/2018 |
| JP | 2018-116343 A | 7/2018 |
| JP | 2019-038075 A | 3/2019 |
| WO | 2013/018323 A1 | 2/2013 |
| WO | 2014/101955 A1 | 7/2014 |
| WO | 2017/217296 A1 | 12/2017 |

OTHER PUBLICATIONS

Search Report dated Aug. 18, 2020 in corresponding Japanese Application No. 2018-139198; 30 pages including English-language translation.
Office Action dated Sep. 29, 2020 in corresponding Japanese Application No. 2018-139198; 9 pages including English-language translation.
U.S. Office Action dated May 26, 2020, in connection with corresponding U.S. Appl. No. 16/451,668 (21 pp.).
Office Action dated Sep. 8, 2020 in corresponding Japanese Application No. 2018-163819; 9 pages including English-language translation.
Search Report dated Aug. 25, 2020 in corresponding Japanese Application No. 2018-163819; 21 pages including English-language translation.

* cited by examiner

SENSING SYSTEM, WORK SYSTEM, AUGMENTED-REALITY-IMAGE DISPLAYING METHOD, AND PROGRAM

CROSS-REFERENCE TO RELATED APPLICATIONS

This application is based on and claims priority to Japanese Patent Application No. 2018-163819 filed on Aug. 31, 2018, the content of which is incorporated herein by reference in its entirety.

FIELD

The present invention relates to a sensing system, a work system, an augmented-reality-image displaying method, and programs therefor.

BACKGROUND

In the related art, there is a known work system provided with a visual sensor for detecting the position of a target object being moved by a moving apparatus and a robot that performs picking work of the target object on the basis of the detection results of the visual sensor (for example, see Japanese Unexamined Patent Application, Publication No. 2005-111607).

In addition, there is a known system that displays the path of a taught motion of a robot on a display device on the basis of a 3D model of the robot and the position of the viewpoint of an operator on 3D coordinates (for example, Japanese Unexamined Patent Application, Publication No. 2017-100234).

SUMMARY

A sensing system according to a first aspect of the present invention is provided with: a detecting device that is used to detect a target; a target detecting unit which detects the target by applying predetermined processing to data obtained by the detecting device; an augmented-reality-image creating unit which creates an augmented-reality image corresponding to a candidate in a plurality of candidates that appear in the processed data to which the predetermined processing has been applied, a predetermined parameter of the candidate being equal to or greater than a detection threshold, and which creates a candidate augmented-reality image corresponding to a candidate in the plurality of candidates, the predetermined parameter of the candidate for the candidate augmented-reality image being less than the detection threshold and equal to or greater than a detection candidate threshold; and a display device or a projection apparatus that displays or projects the augmented-reality image and the candidate augmented-reality image.

A work system according to a second aspect of the present invention is provided with the sensing system; and a work machine.

A third aspect of the present invention is an augmented-reality-image displaying method that is employed in a system that performs predetermined processing on data obtained by a detecting device and thereby detects a target, the augmented-reality-image displaying method including: creating an augmented-reality image corresponding to a candidate in a plurality of candidates that appear in the processed data to which the predetermined processing has been applied, a predetermined parameter of the candidate being equal to or greater than a detection threshold, and creating a candidate augmented-reality image that corresponds to a candidate in the plurality of candidates, the predetermined parameter of the candidate for the candidate augmented-reality image being less than the detection threshold and equal to or greater than a detection candidate threshold; and displaying or projecting the augmented-reality image and the candidate augmented-reality image.

A fourth aspect of the present invention is a storage medium that stores a program that is employed in a system that performs predetermined processing on data obtained by a detecting device and thereby detects a target, wherein the program causes a computer to execute: creating an augmented-reality image corresponding to a candidate in a plurality of candidates that appear in the processed data to which the predetermined processing has been applied, a predetermined parameter of the candidate being equal to or greater than a detection threshold, and creating a candidate augmented-reality image that corresponds to a candidate in the plurality of candidates, the predetermined parameter of the candidate for the candidate augmented-reality image being less than the detection threshold and equal to or greater than a detection candidate threshold; and displaying or projecting the augmented-reality image and the candidate augmented-reality image.

DETAILED DESCRIPTION

A sensing system according to an embodiment of the present invention will be described below with reference to the drawings.

Figure 1:
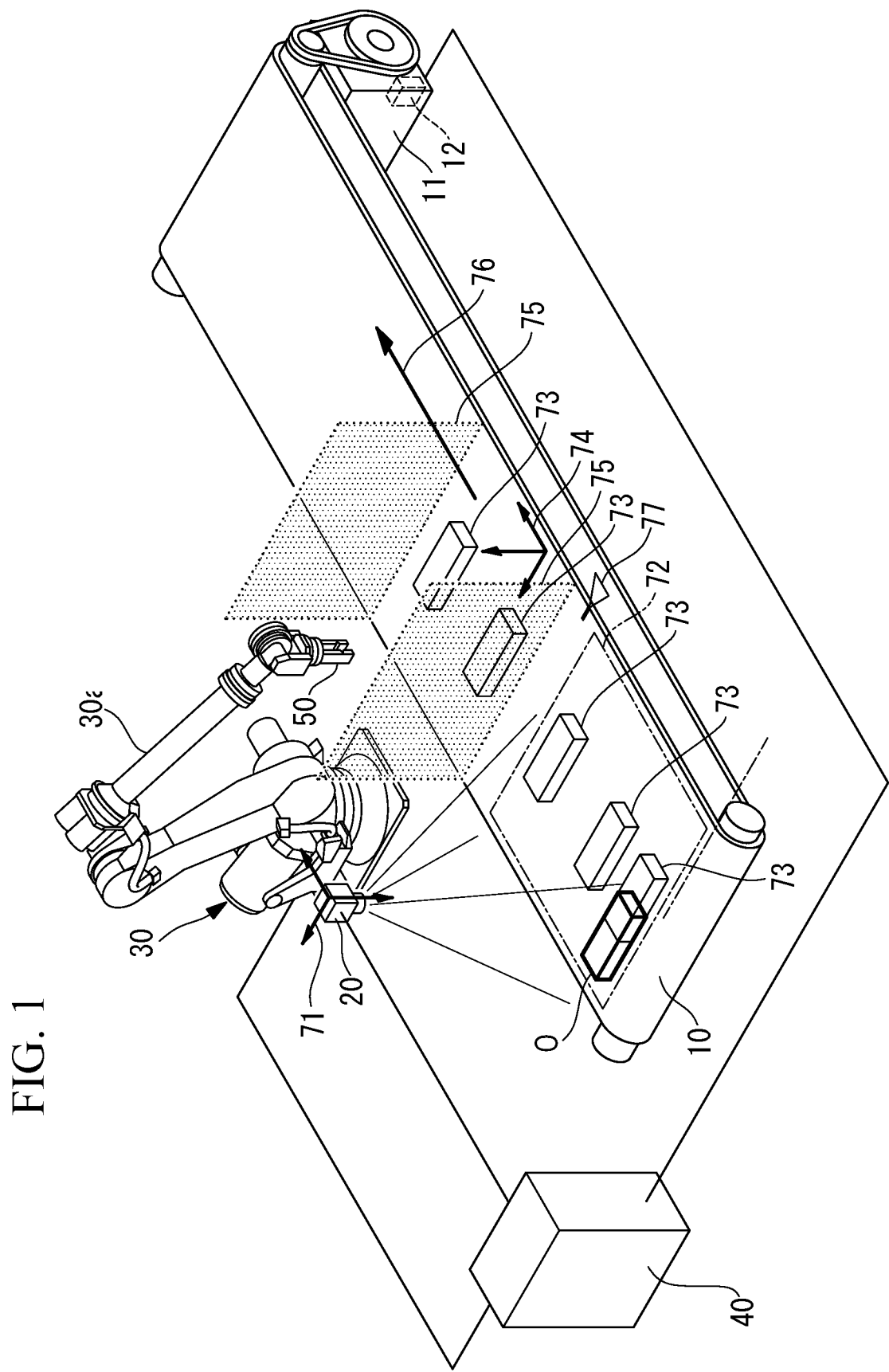
FIG. 1 is a diagram showing a schematic configuration of a sensing system according to an embodiment of the present invention and an example movement thereof.
Figure 2:
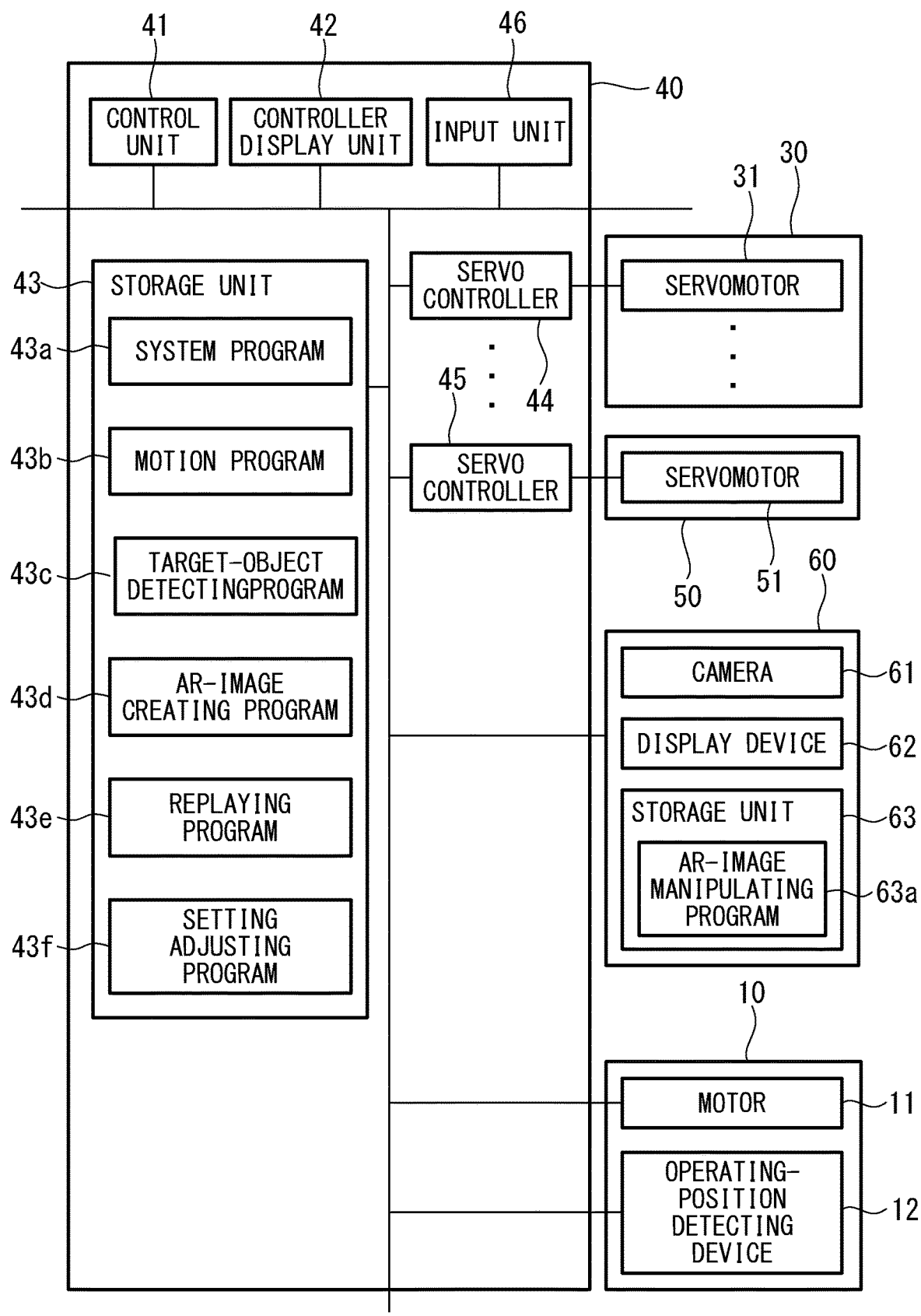
FIG. 2 is a block diagram of a controller of the sensing system of this embodiment.

As shown in FIG. 1, a sensing system according to this embodiment is provided with: a moving apparatus 10 that serves as a moving means for transferring a target object O as an object; a detecting device 20 that is used to detect the target object O that is moved by the moving apparatus 10; a robot 30 which is a work machine that performs predetermined work on the target object O being moved by the moving apparatus 10; a controller 40 that controls the robot 30; and an augmented reality apparatus 60 (FIG. 2). The sensing system of this embodiment is also a work system because said sensing system is a system in which the robot 30, which is a work machine, performs the predetermined work on the sensed target object O.

The sensing system may be used to detect the target object O that is not moving, such as a target object O placed on a fixed base.

The moving apparatus 10 moves the target object O as a result of driving the motor 11. The motor 11 is provided with an operating-position detecting device 12, and the operating-position detecting device 12 successively detects the rotational position and the rotation amount of an output shaft of the motor 11. The operating-position detecting device 12 is, for example, an encoder, and values detected by the operating-position detecting device 12 are transmitted to the controller 40. Note that the operating position of the target object O may be detected by the detecting device 20 without using an encoder.

The target object O may be any of various types of articles, such as a vehicle body, a frame, a component, a food product, and a medical product. It is possible to employ a moving apparatus other than the moving apparatus 10 shown in FIG. 1, and it suffices so long as the moving apparatus 10 is capable of transferring the target object O.

The detecting device 20 is a 2D camera, a 3D camera, a 3D distance sensor, or the like, and the detecting device 20 transmits obtained image data (data) or point group data (data) to the controller 40. As will be described later, the controller 40 detects the position and orientation of the target object O on the basis of the image data or the point group data.

Although the robot 30 is not limited to a specific type of robot, the robot 30 of this embodiment is an articulated robot provided with a plurality of servomotors 31 that individually drive a plurality of movable portions (see FIG. 2). Note that an arm 30*a* of the robot 30 is constituted by the plurality of movable portions. The servomotors 31 have operating-position detecting devices, respectively, for detecting the operating positions thereof, and the operating-position detecting devices are, for example, encoders. The values detected by the operating-position detecting devices are transmitted to the controller 40. By doing so, the controller 40 can recognize the position, velocity, acceleration, and so forth of each portion of the robot 30.

The robot 30 performs predetermined work on the target object O in accordance with the type of a tool 50 provided at a tip portion thereof. It suffices so long as the tool 50 is a tool for a robot, including a gripping tool, a vacuum tool, a processing tool, a cleaning tool, an assembly tool, a measuring tool, various types of sensors, a vision-system camera, or the like. A processing tool is, for example, a drilling tool such as an electric drill, a threading tool provided with a tap at the tip thereof, an electric lapping tool, a painting tool such as a paint gun, or a welding tool such as a servo gun. A tool employed in assembly is, for example, an electric driver or a tool for gripping a pin and inserting the pin into a hole. A measuring tool is, for example, a film-thickness measuring device, an ultrasonic internal inspection apparatus, a durometer, a non-contact thermometer, or a close-up camera. Note that the target object O may be a hole provided in an object, a processing-target portion, or the like.

The tool 50 of this embodiment is a hand, and the robot 30 unloads the target object O on the moving apparatus 10 by using the tool 50.

The tool 50 is provided with a servomotor 51 that drives claws (see FIG. 2). The servomotor 51 has an operating-position detecting device for detecting the operating position thereof, and an example of the operating-position detecting device is an encoder. The values detected by the operating-position detecting device are transmitted to the controller 40.

The coordinate system of the robot 30 and the coordinate system of the moving apparatus 10 are associated with each other. In this embodiment, as a result of bringing a setting tool provided at the tip portion of the robot 30 into contact with, at a plurality of predetermined locations, calibration jig installed on the moving apparatus 10, a reference coordinate system to be used as the coordinate system of the robot 30 and the moving apparatus 10 are set. In addition, on the basis of image data of the calibration jig obtained by the detecting device 20, the position and orientation (sensor coordinate system) of the detecting device 20 are associated with the reference coordinate system.

As shown in FIG. 2, the controller 40 is provided with: a control unit 41 having a CPU, a RAM, and so forth; a controller display unit 42 that displays the setting, menu, and so forth of the controller 40; a storage unit 43 having a non-volatile storage, a ROM, and so forth; a plurality of servo controllers 44 that individually correspond to the servomotors 31 of the robot 30; a servo controller 45 that corresponds to the servomotor 51 of the tool 50; and an input unit 46 connected to the controller 40. The input unit 46 is an input device such as an operation panel that an operator can carry. There are cases in which the input unit 46 wirelessly communicates with the controller 40.

The storage unit 43 stores a system program 43*a*, and the system program 43*a* carries out the basic functions of the controller 40. In addition, the storage unit 43 stores a motion program 43*b*, a target-object detecting program 43*c*, and so forth. On the basis of the target-object detecting program 43*c*, the control unit 41 applies, to the image data transmitted thereto from the detecting device 20, well-known image processing, center-of-gravity-position detecting processing, pattern matching processing, other necessary processing, and so forth to detect the target object O, and detects the position, the orientation, and so forth of the target object O being moved by the moving apparatus 10. Note that, in the case in which the detecting device 20 is capable of performing the image processing, the detecting processing, the pattern matching processing, and so forth, the control unit 41 does not need to perform processing that is redundant with the processing performed by the detecting device 20.

In addition, on the basis of the target-object detecting program 43*c*, the control unit 41 follows (tracks) the position and orientation of the target object O being moved by the moving apparatus 10, starting from immediately after the timing when the target object O is detected, by using the detection results of the operating-position detecting device 12 (the detection results of the movement of the moving apparatus 10). In this way, on the basis of the image data transmitted thereto from the detecting device 20 and the detection results of the operating-position detecting device 12, the control unit 41 is capable of detecting the position, the velocity, the movement amount, and so forth of the target object O being moved by the moving apparatus 10.

The augmented reality apparatus 60 includes: a control unit having a CPU, a RAM, and so forth; a storage unit 63 having a non-volatile storage, a ROM, and so forth; and an input unit such as a keyboard, and so forth. As shown in FIG. 2, in an example, a camera 61 that is installed at a predetermined position in order to acquire images of the moving apparatus 10 and the robot 30 and a display device 62 that displays real-space images acquired by the camera 61 are provided. It is possible to employ a publicly known display device, such as a tablet-type device, a head-mounted display, and glasses with an AR display function, as the display device 62. In this case, the camera 61 may be installed in a tablet-type device, a head-mounted display, or glasses with an AR display function. The image data acquired by the camera 61 is transmitted to the controller 40. In addition, the display device 62 displays on the basis of the augmented-reality image data transmitted thereto from the controller 40. The augmented-reality images may be 3D images or 2D images. Hereinafter, "augmented reality" may also be indicated as "AR". On the basis of the image data acquired by the camera 61 regarding marks affixed to the calibration jig and the robot or the shape of the robot itself, the position and orientation of the camera 61 (camera coordinate system) may be associated with the reference coordinate system. In order to associate the position of the real space and the positions of the AR images without changing the dimensions thereof, it is preferable that the real-space images acquired by the camera 61 are 3D images acquired by a 3D camera; however, it is also possible to employ another type of camera that acquires 2D images as real-space images.

Note that the reference coordinate system may automatically be associated with the camera coordinate system, or the coordinate systems may be manually aligned by a user directly manipulating the AR images.

Note that the reference coordinate system need not be associated with the camera coordinate system. In this case, although the AR images are not superimposed on real space, the relative relationship of the objects in real space and the relative relationship of the objects in the AR images are identical, and thus, if there is an abnormality in the relative relationship of the objects in the AR images, it is understood that the actual setting is also not accurate.

(Basic Processing for Displaying Augmented Reality)

On the basis of an AR-image creating program 43d stored in the storage unit 43, the control unit 41 successively creates AR image data related to at least one type of the following information pieces: the settings related to the detection of the target object O performed by using the detecting device 20; the setting of the moving apparatus 10; the setting of the robot 30; the position and orientation of the target object O being recognized by the control unit 41 on the basis of the settings; the result of the detection of the target object O performed by the detecting device 20; the work plan of the moving apparatus 10; the work plan of the robot 30; the determination result of the control unit 41 related to the execution of the work performed by the robot 30; and the parameters related to the target object O being recognized by the control unit 41, and the control unit 41 transmits the created AR image data to the display device 62. The positions and orientations of the AR images are adjusted on the basis of the camera coordinate system or the reference coordinate system. By doing so, the display device 62 displays the real-space images received from the camera 61 and the AR images received from the controller 40.

Note that the AR images may be created by the augmented reality apparatus 60 by acquiring the data from the control unit 41.

The communication between the controller 40 and the augmented reality apparatus 60 may be performed via wires or may be performed wirelessly.

In the example in FIG. 1, as the settings related to the detection of the target object O performed by using the detecting device 20, an AR image 71 of the sensor coordinate system of the detecting device 20 and an AR image 72 of the detection area of the detecting device 20 are displayed. As the settings related to the detection of the target object O performed by using the detecting device 20, AR images indicating the position and direction of the detecting device 20 may be displayed, and the frame rate of the detecting device 20, the position and direction of the detecting device 20, the adjustment values of the aperture and the exposure time of the detecting device 20, the elapsed time after the detecting device 20 was firstly used in operation, and so forth may be displayed in the forms of AR images of indicators, numerical values, characters, and so forth. The indicators may express the magnitudes by means of colors.

The position and area of the AR image 72 in the detection area are set on the basis of calibration. For these settings, for example, the position and size of a mark, a pattern, the target object O, or the like on the moving apparatus 10 may be employed as references. In the case in which the AR image 72 of the detection area is displayed, it is possible for the operator to easily check the relationship between the detection area and work area of the robot 30 in order to see whether or not the placement of the target object O on the moving apparatus 10 is appropriate.

In the example in FIG. 1, on the basis of the positions and orientations of the target objects O detected by the control unit 41, AR images 73 that indicate the positions and orientations of the target objects O being recognized by the control unit 41 are displayed. FIG. 1 shows an example in which the AR images 73 are deviated from the target objects O in the real-space images in a width direction of the moving apparatus 10. In this embodiment, although the AR images 73 have shapes that are similar to or identical to the shapes of the target objects O, the AR images 73 may be points that indicate the positions, orientations, and so forth of the target objects O, a display image that indicates the movement directions, velocities, and so forth of the target objects O, abstract views of the target objects O, other alternative diagrams, or the like. Similar display image is possible for other AR images described above and described below. The positions and orientations of the AR images 73 change in accordance with the positions and orientations of the target objects O detected by the control unit 41.

In addition, in the example in FIG. 1, the reference coordinate system, which is a setting of the robot 30, is displayed as an AR image 74. As the setting of the robot 30, the real motion velocity of the robot 30, the maximum velocity of the robot 30, the elapsed time after the robot 30 was firstly used in operation, and so forth may be displayed as AR images of indicators, numerical values, characters, and so forth.

As a result of displaying the calculation results of the velocities or accelerations of the tip portion of the robot 30, the tool 50, the target object O gripped by the tool 50, and so forth in the forms of AR images of indicators, numerical values, characters, and so forth, it is possible to intuitively recognize the suitability or the like of the load applied to the tool 50, the load applied to the target object O gripped by the tool 50, the gripping force of the tool 50, and so forth. The velocities and the accelerations may reflect the rotation of a wrist flange of the robot 30.

In addition, in the example in FIG. 1, the work area of the robot 30, which is a setting of the robot 30, is displayed as an AR image 75. In this embodiment, the work area is an area in which the robot 30 performs picking work of the target objects O. With this configuration, it is possible for the operator to intuitively recognize the relationship between the work area and an area in which the operator operates, the relationship between the work area and the work area of another robot, the size of the work area with respect to the work contents, and so forth.

In addition, in the example in FIG. 1, as the setting of the moving apparatus 10, an AR image 76 of the transfer direction of the moving apparatus 10 is displayed. As the setting of the moving apparatus 10, the transfer velocity, the elapsed time after the moving apparatus 10 was firstly used in operation, and so forth may be displayed in the forms of AR images of indicators, numerical values, characters, and so forth.

The transfer direction of the moving apparatus 10 is, for example, calculated on the basis of positional changes of the target objects O being moved by the moving apparatus 10. In this case, it is preferable that the camera 61 be provided above the moving apparatus 10. This configuration makes it possible to visually check the relationship between the AR image 74 and the AR image 76, which is advantageous for checking whether or not the transfer direction of the moving apparatus 10 is appropriate with respect to the setting of the reference coordinate system or the like.

In addition, as the setting of the moving apparatus 10, an indication mark that points at a specific position where a belt of the moving apparatus 10 being recognized by the controller 40 is located may be displayed as an AR image 77 in order to indicate the transfer velocity of the moving apparatus 10.

In addition, a motion restricted region of the robot 30 may be displayed on the display device 62 as an AR image. The motion restricted region is a region that is set in an area surrounding the operator, peripheral equipment, or the like, and is a region in which the motion of the robot 30 is halted or restricted. In this case, it becomes possible to intuitively recognize the area set to be the motion restricted region.

In addition, as the results of the detections of the target objects O by the detecting device 20, images detected by the detecting device 20 or images obtained by applying the image processing to said images, representing the positions, orientations, shapes, or the like of the target objects O may be displayed on the display device 62 in the form of AR images.

In this case, it is possible for the operator to intuitively recognize the suitability of the detections of the target objects O by the detecting device 20. For example, it is possible to check the suitability of lighting on the target objects O, the suitability of a detection threshold with respect to the lighting on the target objects O, the suitability of the positions, the orientations, the shapes, or the like of the target objects O that have been detected by the detecting device 20 and that are being recognized by the controller 40. In the case in which the lighting and the detection threshold are not appropriate, a portion of or the entirety of a target object O that is a bright portion or a dark portion may not be detected, which tends to occur frequently. In addition, by comparing the positions, orientations, and shapes of the target objects O detected by the detecting device 20 with those of the actual objects, the operator can intuitively check the suitability of the detections by the detecting device 20. This configuration is useful because the detection by the detecting device 20 greatly influences the success/failure of the work performed by the robot 30, the suitability thereof, and so forth.

Note that it is also possible to successively update, on the basis of the results of the detections of the target objects by the detecting device 20, the positions, orientations, and shapes of the target objects O, which are displayed on the display device 62 in the form of AR images, in accordance with the actual movement of the target objects.

In addition, at an arbitrary point in time, it is possible to stop updating and to check the results, and it is also possible to replay the recorded results.

Figure 3:
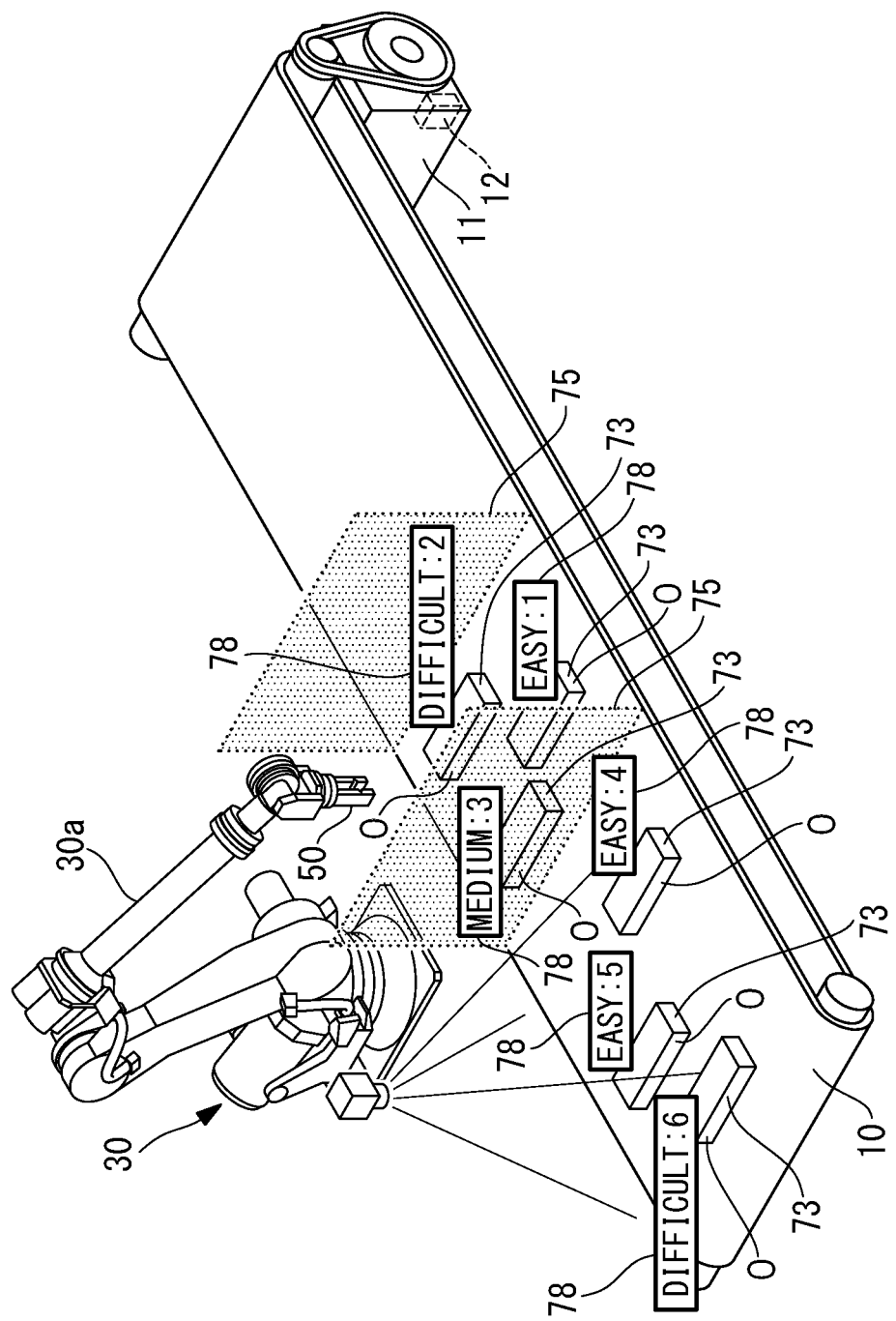
FIG. 3 is a diagram showing an example display image of a display device of the sensing system of this embodiment.

In addition, as shown in FIG. 3, as the work plan of the robot 30, indicators, numerical values, characters, and so forth that indicate a planned order in which the robot 30 performs work on a plurality of target objects O that are followed by the control unit 41, whether or not it is possible to perform the work, the work difficulty (an attribute of the target objects O), the type, weight, hardness, and material of the target objects O (attributes of the target objects O), inspection results of the target objects O, and so forth may be displayed on the display device 62 in the form of AR images 78. Here, the planned order, whether or not it is possible to perform the work, and the work difficulty are determination results of the control unit 41 related to the execution of the work, and the type, weight, hardness, material, and inspection result of the target objects O are the parameters related to the target objects O being recognized by the control unit 41.

Note that it is also possible to successively update, on the basis of the results of the detections of the target objects by the detecting device 20, the AR images 78 displayed on the display device 62 in accordance with the actual movement of the target objects. In addition, at an arbitrary point in time, it is possible to stop updating and to check the results, and it is also possible to replay the recorded results.

In this case, it is possible for the operator to intuitively recognize the work plan of the robot 30. For example, as shown in FIG. 3, in the case in which the planned order of a target object O on the downstream side in the transfer direction is not appropriate among the plurality of target objects O disposed between the pair of AR images 75, which indicate the work area of the robot 30, it is possible to easily recognize this fact.

Figure 4:
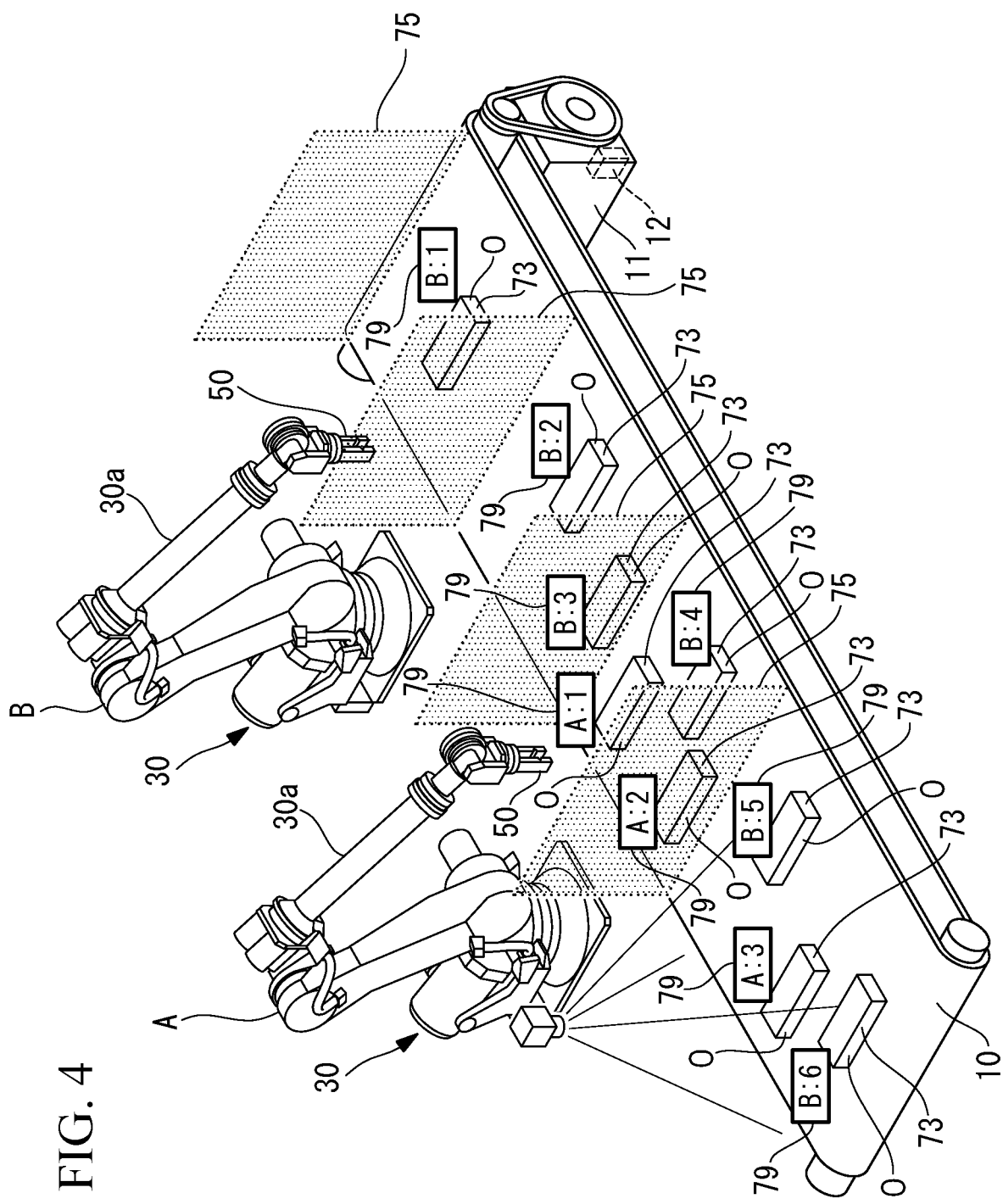
FIG. 4 is a diagram showing an example display image of the display device of the sensing system of this embodiment.

Note that, as shown in FIG. 4, in the case in which a plurality of robots 30 perform work on the target objects O, it is possible to display, on the display device 62 in the form of AR images 79, the planned order with which the work is performed for the respective robots 30. This configuration makes it possible to intuitively recognize the distribution of work among the individual robots 30 or the like. The AR images 79 of the work order may be individually transmitted to the display device 62 from the controllers 40 of both robots 30, or the AR images 79 may be transmitted to the display device 62 from the controller 40 of one of the robots 30. In addition, the AR images 79 of the work order may be transmitted to the display device 62 from a higher-level controller that is connected to the robots 30. Here, the planned order is a determination result of the control unit 41 related to the execution of the work.

Note that it is also possible to successively update, on the basis of the results of the detection of the target objects by the detecting device 20, the AR images 79 displayed on the display device 62 in accordance with the actual movement of the target objects. In addition, at an arbitrary point in time, it is possible to stop updating and to check the results, and it is also possible to replay the recorded results.

In addition, as the work plan of the moving apparatus 10, it is also possible to display the future positions and future orientations that are expected in the near future for the plurality of target objects O being followed by the control unit 41 on the display device 62 as AR images. In this case, the operator can easily check the movement directions, orientations during movement, and so forth of the target objects O.

Note that it is also possible to successively update, on the basis of the results of the detections of the target objects by the detecting device 20, the AR images displayed on the display device 62 in accordance with the actual movement of the target objects. In addition, at an arbitrary point in time, it is possible to stop updating and check the results, and it is also possible to replay the recorded results.

As a result of displaying the AR images on the display device 62 as has been described above, it is possible for the operator to intuitively recognize the settings related to the detections of the target objects O performed by using the detecting device 20, the settings of the moving apparatus 10, the settings of the robot 30, the positions and orientations of the target objects O being recognized by the control unit 41 on the basis of the settings, the results of the detections of the target objects O by the detecting device 20, the work plan of the moving apparatus 10, the work plan of the robot 30, and the determination results of the control unit 41 related to the execution of the work performed by the robot 30, or the parameters related to the target objects O being recognized by the control unit 41. This effect is extremely advantageous in order: to reduce the amount of work time required to perform the settings, grasp a phenomenon, investigate the cause of the phenomenon, and so forth; to enhance the work efficiency via improvement of settings; and to enhance the sense of setting.

(Displaying Detection Results that do not Qualify as Work Targets)

In FIGS. 3 and 4, the individual AR images 73 show the target objects O as work targets on which the robot(s) 30 can perform work. In contrast, for example, when detections of the target objects O are not satisfactory, when the orientations of the detected target objects O are not appropriate for performing the work thereon, or the like, there are cases in which the robot(s) 30 do not execute or cannot execute the work on some of the target objects O among the plurality of target objects O. For example, when a detection parameter of a target object O is less than a detection threshold thereof, this target object O would not be detected as a work target. In addition, when a parameter related to the orientation of a target object O in a detected image is less than an orientation threshold thereof, it is determined that the orientation of the target object O is not appropriate for performing the work thereon.

The lighting on the target objects O, the orientations of the target objects O, the shapes of the target objects O, the material of the target objects O, the settings of the detecting device 20 including the aperture, the exposure time, and so forth are the causal factors that influence appropriate detections of the target objects O, and the settings of the detection thresholds employed in determination of whether or not a target object O will be detected as a work target also influence appropriate detections of the target objects O. As the detection thresholds, it is possible to use a parameter related to contrast, a parameter that indicates the difference or similarity of the shape with respect to a model, or the like.

Figure 5:
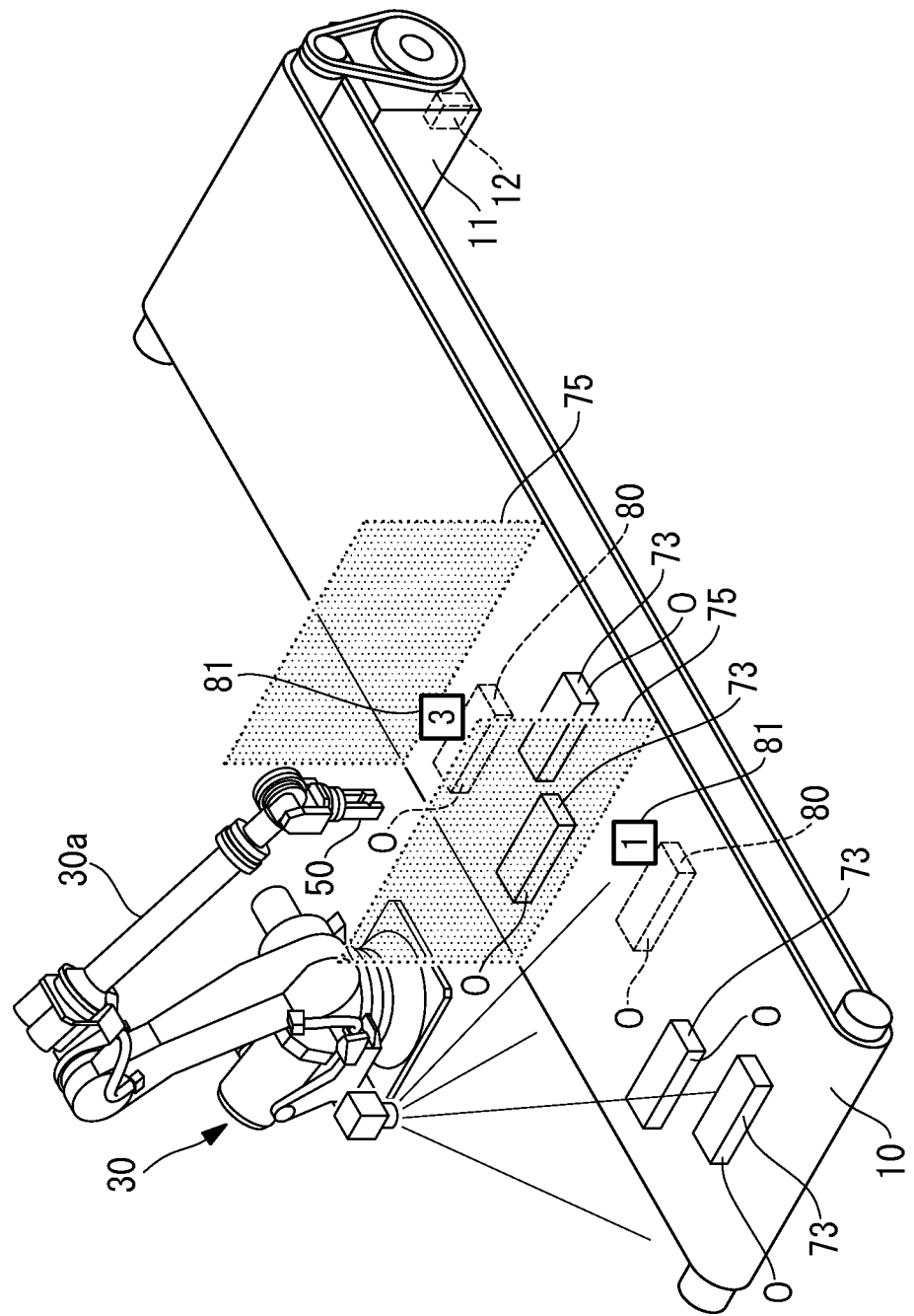
FIG. 5 is a diagram showing an example display image of the display device of the sensing system of this embodiment.

The control unit 41 creates the AR images 73 that correspond to, among candidates that respectively correspond to the target objects O, foreign objects, blemishes on the moving apparatus 10, and so forth in the image data to which the image processing has been applied, candidates in which a predetermined parameter is equal to or greater than the detection threshold, and creates AR images (candidate AR images) 80 that respectively correspond to candidates in which the predetermined parameter is less than the detection threshold and the predetermined parameter is equal to or greater than a detection candidate threshold (FIG. 5). Here, the detection candidate threshold is less than the detection threshold. The AR images 80 are created in a display form that makes it possible to distinguish the AR images 80 from the AR images 73, and, accordingly, the AR images 80 are displayed on the display device 62 in a form that makes it possible to distinguish the AR images 80 from the AR images 73.

With this configuration, it is possible for the operator to relatively easily perform the adjustment of the causal factors for increasing the number of target objects O that are detected at or above the detection threshold, the adjustment of the detection threshold, and so forth.

In addition, the control unit 41 may create AR images 81 of score values that accompany the individual AR images 80, respectively. The score values are indicators that indicate the similarity and degree of concordance between a model and target objects, and, in FIG. 5, the possibility of reaching the detection threshold increases when the score value increases. The score values are examples of detection results, and, as AR images of the detection results, AR images of contrast values, detected positions, type information of the target objects O, ID information of the target objects O, measurement results, and so forth may be created.

As a result of the AR images 81 being displayed on the display device 62, it is possible for the operator to more easily perform adjustment of the causal factors for increasing the number of the target objects O that are detected at or above the detection threshold, the adjustment of the detection threshold, and so forth.

A further description will be given for display of detection results that do not qualify as work targets.

For settings related to detection of one or more target objects O placed on the moving apparatus 10, settings are made on the detecting device 10, an illumination apparatus, and the detection thresholds. In the example in FIG. 6, one of two target objects O arranged in the width direction of the moving apparatus 10 is displayed as a solid-lined AR image 73, and the other of the two target objects O is displayed using a solid-lined AR image 73 and a dashed-lined AR image (candidate AR image) 80. In the example in FIG. 7, one of three target objects O arranged in the width direction of the moving apparatus 10 is displayed as a solid-lined AR image 73, and the other two of the three target objects O are each displayed as a dashed-lined AR image (candidate AR image) 80. In the examples in FIGS. 6 and 7, real images of the target objects O may or may not be displayed.

Figure 6:
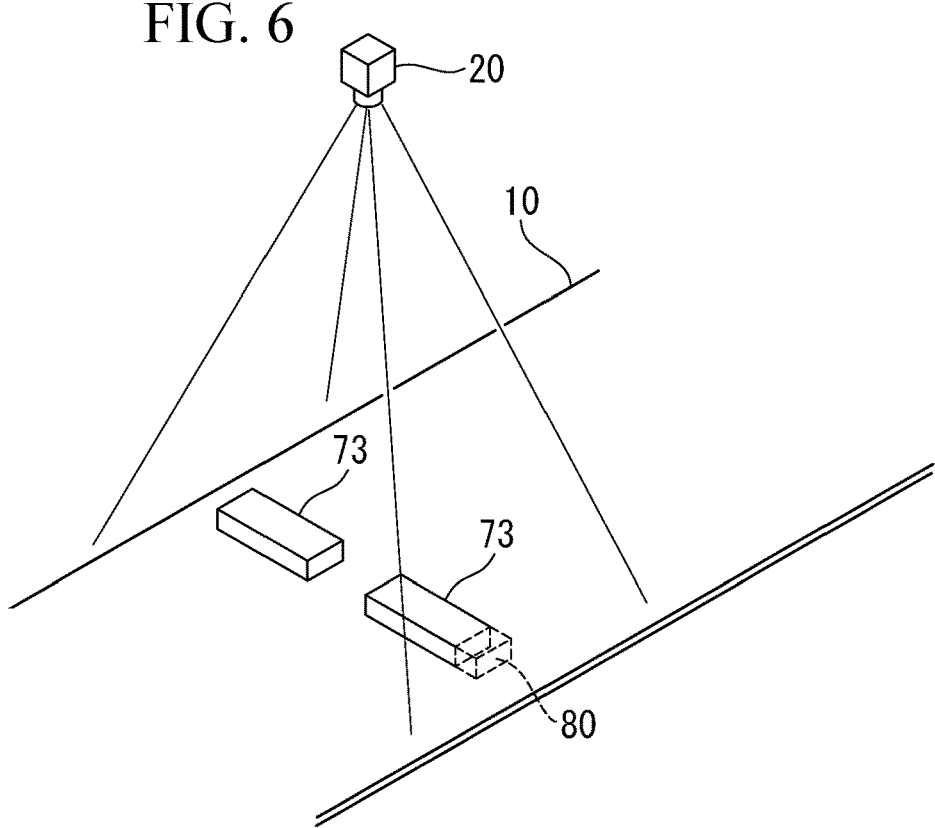
FIG. 6 is a diagram showing an example display image of the display device of the sensing system of this embodiment.
Figure 7:
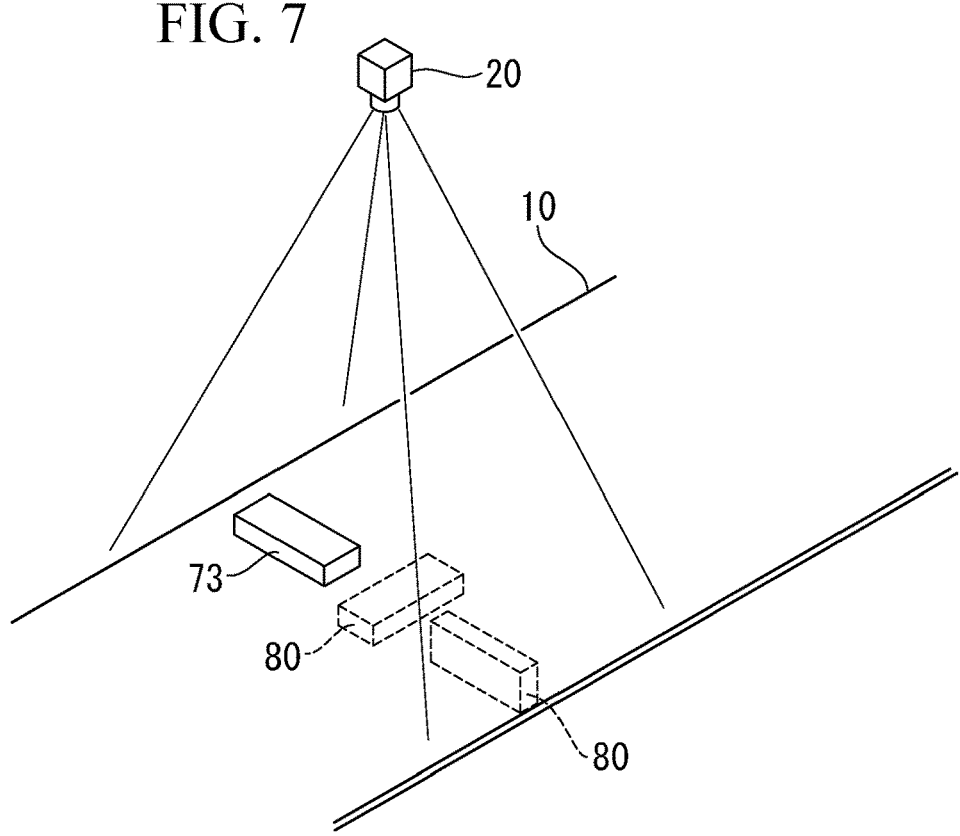
FIG. 7 is a diagram showing an example display image of the display device of the sensing system of this embodiment.

In the example in FIG. 6, for reasons such as inappropriate lighting on the target object O, inappropriate position and orientation of the detecting device 20, blemishes on a part of the top face of the moving apparatus 10, and inappropriate detection thresholds, a parameter related to the contrast of a part of the target object O becomes less than the detection threshold and equal to or greater than the detection candidate threshold. The part of the target object O is thus displayed as the AR image 80. In the example in FIG. 7, for example, a parameter related to the orientation of the two target objects O becomes less than the detection threshold and equal to or greater than the detection candidate threshold. The two target objects O are thus displayed as the AR images 80.

While the work system is in operation, the operator can view the AR images 73 and the AR images 80 on the display device 62. At this time, the AR images 81 of the above score values or the above detection results that accompany the individual AR images 80 may be displayed on the display device 62. That is, while the work system is in operation, the operator can check settings of the work system, investigate causes of success/failure of the operation of the system, or make settings of the work system.

Prior to the start of the work system, with the moving apparatus 10 stopped or running slowly for example, the operator can perform various adjustments while looking at the AR images 73, 80, and 81 displayed on the display device 62. Examples of the various adjustments include adjustments of the position, orientation, and so forth of the illumination apparatus, change of the illumination apparatus, confirmation of any failure in the illumination apparatus, adjustments of the aperture, the exposure time, and so forth of the detecting device 20, adjustments of the position, orientation, and so forth of the detecting device 20, and setting of the detection thresholds. The operator can view the adjustment results on the display device 62, which allows the operator to perform the adjustments efficiently.

Further, while the target objects O are gradually moving by the moving apparatus 10, the operator can, by looking at the AR images 73, 80, and 81 displayed on the display device 62, intuitively recognize how the AR images 73, 80, and 81 change within the detection area of the detecting device 20. For example, the operator can intuitively recognize that detection of the target objects O is excellent on the upstream side of the detection area but detection results of a whole or part of some target objects O fall below the detection threshold as they move to the downstream side of the detection area, and recognize portions of the detection area where the detection results fall below the detection threshold and the trend in occurrence of such portions. This is advantageous for performing efficient adjustments. Note that the AR images 71, 72, 74, 75, 76, 77, 78, and 79 may also be displayed on the display device 62.

When the target objects O are perishable foods whose deteriorated parts emit light of a certain wavelength in response to, for example, ultraviolet emitted from the illumination apparatus and the detecting device 20 is a camera capable of taking images of the light of the certain wavelength, the controller 40 calculates the area of the deteriorated parts of the target objects O based on the image data from the detecting device 20 and can thus determine the score value according to the calculated area. The controller 40 then transmits a control command to each servomotor 31 of the robot 30 that, for example, causes the robot 30 to remove the target objects O having a high score value (large area). The controller 40 also creates the AR images 73 representing the target objects O whose score values are equal to or greater than the detection threshold, the AR images 80 representing the target objects O whose score values are less than the detection threshold and equal to or greater than the detection candidate threshold, and the AR images 81 representing the score values.

In this case too, the operator can perform adjustments efficiently by comparing the target objects O in the real space with the display device 62.

Note that the AR image 80 is not necessarily displayed by a dashed line, and instead may be displayed in a different color from the AR image 73. In this case too, the displayed AR image 80 can be distinguished from the AR image 73. Note that the color of the AR image 80 may be changed according to the score value or the detection results described above.

Figure 8:
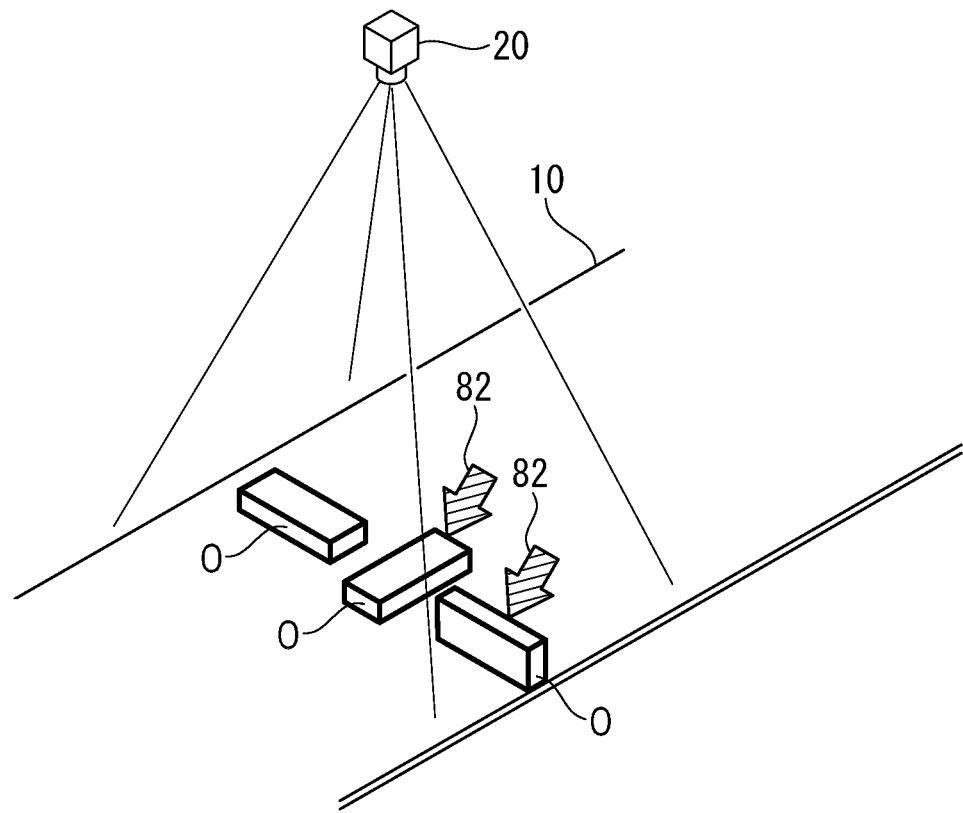
FIG. 8 is a diagram showing an example display image of the display device of the sensing system of this embodiment.

In addition, as shown in FIG. 8, AR images 82 may be displayed that are marks indicating the target objects O having a predetermined parameter less than the detection threshold and equal to or greater than the detection candidate threshold. Instead of the marks, abstract views, alternative diagrams, points, and so forth may be used.

Figure 9:
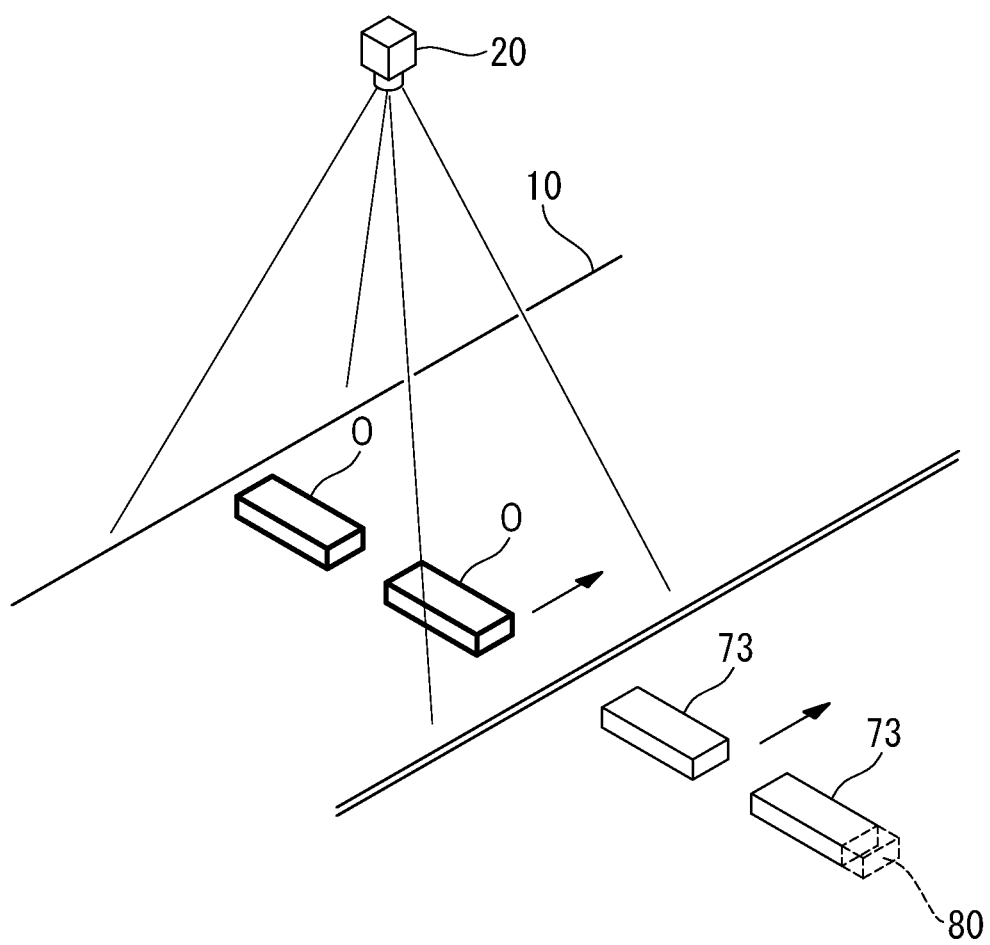
FIG. 9 is a diagram showing an example display image of the display device of the sensing system of this embodiment.

In addition, as shown in FIG. 9, the AR images 73, 80 may be displayed at different positions from the target objects O. In FIG. 9, the AR images 73, 80 are displayed at positions deviated from the positions of the target objects O in a direction perpendicular to the moving direction of the moving apparatus 10. In this case, the AR images 73, 80 may be moved along with the movement of the target objects O by the moving apparatus 10. Depending on the kind or other characteristics of the target objects O, displaying the AR images 73, 80 at positions different from the target objects O may allow the operator to more clearly and easily recognize how the target objects O are being detected.

Described below are examples of display of the detection results.

The detecting device 20 may be mounted on an autonomous work machine. In this case, the detecting device 20 is a stereo camera (three-dimensional camera), for example. To fit the point group data into the real space, known calibration is performed on the detecting device 20. On the basis of the target-object detecting program 43c, the control unit 41 detects the shape of the target objects O existing on the real space, the position and orientation of the target objects O, the distance from the target objects O, and so forth.

Figure 10:
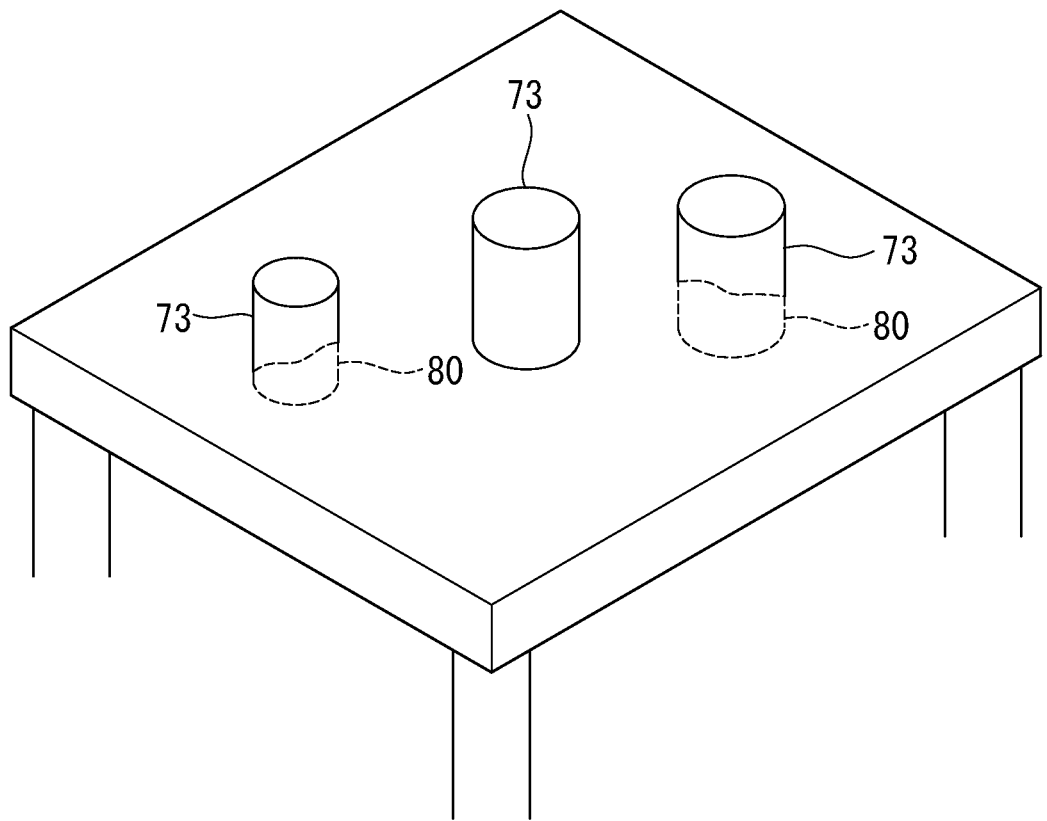
FIG. 10 is a diagram showing an example display image of the display device of the sensing system of this embodiment.

In one example, the control unit 41 creates the solid-lined AR images 73 for portions where a parameter related to the contrast in each of pairs of images of the stereo camera is equal to or greater than the detection threshold, and creates the dashed-lined AR images 80 for portions where the parameter is less than the detection threshold and equal to or greater than the detection candidate threshold. The AR images 73 and the AR images 80 are thus displayed on the display device 62 (FIG. 10). At this time, the AR images 81 of the above score values or the above detection results that accompany the individual AR images 80 may be displayed on the display device 62. This allows the operator to perform various adjustments while looking at the AR images 73, 80, and 81 displayed on the display device 62.

Examples of the various adjustments include adjustments of the aperture and so forth of the detecting device 20, adjustments of the position, orientation, and so forth of the detecting device 20, settings of the detection thresholds, adjustments of the position, orientation, and so forth of the illumination apparatus mounted on the work machine, confirmation of any failure in the illumination apparatus mounted on the work machine, and change of the illumination apparatus mounted on the work machine. There are various causal factors that prevent detection by the detecting device 20. For example, settings of the detecting device 20, the kind of illumination, and so forth need to be changed appropriately according to the color, material, and so forth of the target object O, and there are numerous adjustment parameters involving these characteristics. The above configuration provides an immediate display of the adjustment results on the display device 62, allowing the operator to perform the adjustments efficiently.

Figure 11:
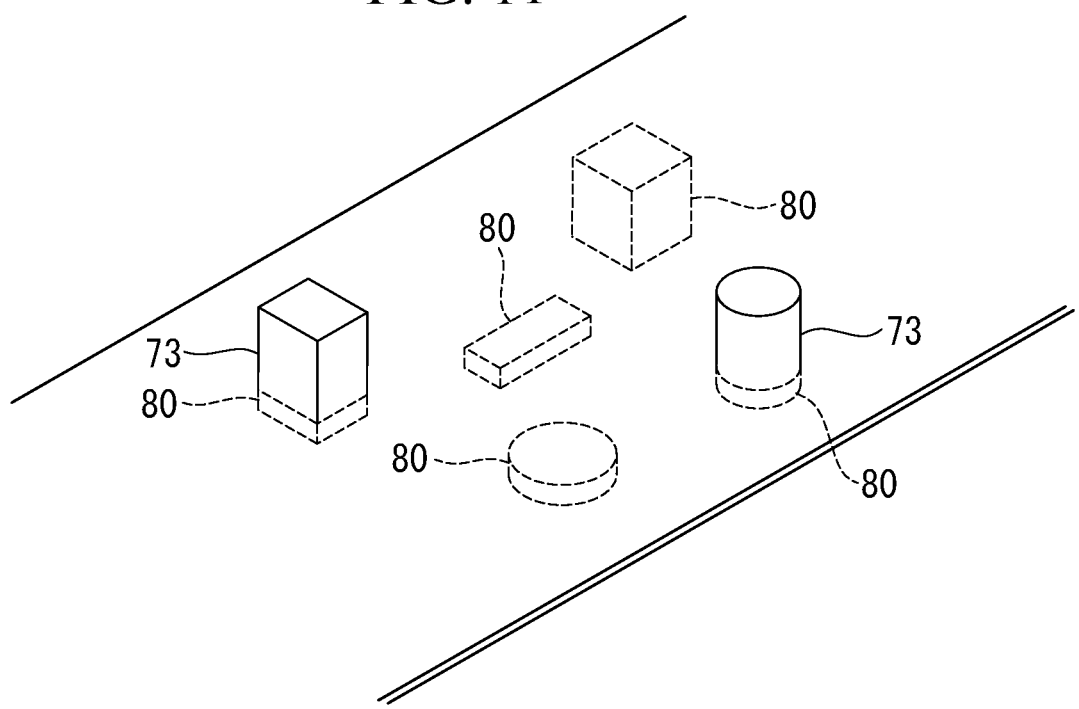
FIG. 11 is a diagram showing an example display image of the display device of the sensing system of this embodiment.

In another example, the control unit 41 uses a detection threshold to detect whether the target object O can be an obstacle, and creates the solid-lined AR images 73 each for the target object O or its portion whose parameter related to the height is equal to or greater than the detection threshold and creates the dashed-lined AR images 80 each for the target object O or its portion whose parameter related to the height is less than the detection threshold and equal to or greater than the detection candidate threshold. The AR images 73 and the AR images 80 are thus displayed on the display device 62 (FIG. 11). At this time, the AR images 81 of the above score values or the above detection results that accompany the individual AR images 80 may be displayed on the display device 62. This allows the operator to perform various adjustments while looking at the AR images 73, 80, and 81 displayed on the display device 62. Examples of the various adjustments include adjustments of the position, orientation, and so forth of the detecting device 20, settings of the detection thresholds, adjustments of the position, orientation, and so forth of the illumination apparatus mounted on the work machine, confirmation of any failure in the illumination apparatus mounted on the work machine, and change of the illumination apparatus mounted on the work machine. The adjustment results are displayed on the display device 62, allowing the operator to perform the adjustments efficiently.

Note that the AR images 71-82 are successively created and recorded (updated) as the time passes. Accordingly, the AR images 71-82 are also successively updated on the display device 62 in accordance with the real-space images.

Alternatively, the controller 40 may create and record the AR images 71-82 in real time, and the display device 62 may, in accordance with an input to a predetermined input unit or establishment of predetermined conditions in the controller 40 or the sensor, display those AR images selected from the plurality of AR images 71-82 at or immediately before the point in time of such input to the input unit or such establishment of the conditions.

(Re-Display Processing)

The controller 40, the augmented reality apparatus 60, and so forth have a function for saving the real-space images and the AR images 71-82 displayed on the display device 62. In the case in which the controller 40 saves the images, the image data from the camera 61 successively received from the augmented reality apparatus 60 and the AR image data that are successively created are at least temporarily saved in the storage unit 43 on the basis of a replaying program 43e stored in the storage unit 43. In the case in which the augmented reality apparatus 60 saves the images, the image data from the camera 61 and the AR image data that are successively received from the controller 40 are at least temporarily saved in a storage unit of the augmented reality apparatus 60 on the basis of a replaying program stored in the storage unit of the augmented reality apparatus 60. Another apparatus, computer terminal, and so forth may similarly save the images.

Also, the controller 40 or the augmented reality apparatus 60 performs, in accordance with the operation of the input unit 46 or an input unit of the augmented reality apparatus 60, replay, slow replay, paused display during replay, and so forth on the controller display unit 42, the display device 62, and so forth by using the saved real-space-image data and AR image data. Accordingly, it is possible for the operator to repeatedly view the superimposed display of the real-space images and the AR images 71-82. Note that the controller 40 or the augmented reality apparatus 60 may display at least one of the real-space images and the AR images 71-82 selected by the operator on the controller display unit 42, the display device 62, and so forth. This allows the operator to focus on particular target objects that he/she wants to look at.

With this configuration, it is possible for the operator to more accurately recognize the settings related to the detections of the target objects O performed by using the detecting device 20, the settings of the moving apparatus 10, the settings of the robot 30, the positions and orientations of the target objects O being recognized by the control unit 41 of the controller 40 on the basis of the settings, the results of the detections of the target objects O by the detecting device 20, the work plan of the moving apparatus 10, or the work plan of the robot 30.

Note that it is also possible for the controller 40, the augmented reality apparatus 60, or the like to transmit the saved real-space-image data and AR image data to another display device.

(Displaying Augmented-Reality Image in Accordance with Selection)

The augmented reality apparatus 60 has a function for displaying only selected AR images on the display device 62. For example, only the AR images 71 selected from the AR images 71-82 are displayed on the display device 62 in accordance with the operation of the input unit of the augmented reality apparatus 60. In FIG. 4, it is also possible to display only the AR images related to one robot 30 among the plurality of robots 30 on the display device 62.

With this configuration, it is possible for the operator to change the AR images to be displayed, as needed, and this is advantageous for reducing the amount of work time related to performing settings, ascertaining a phenomenon, investigating causes of the phenomenon, and so forth.

Effects that are similar to those described above are also achieved in the case in which the controller 40 transmits only the selected AR images to the display device 62.

In addition, the augmented reality apparatus 60 may have a function for displaying, on the display device 62, only the AR images in a selected area. For example, only the AR images that are present in a selected area are displayed on the display device 62 in accordance with the operation of the input unit of the augmented reality apparatus 60.

In this case also, it is possible for the operator to change the area in which the AR images are displayed, as needed, and this is advantageous for reducing the amount of work time related to performing settings, ascertaining a phenomenon, investigating causes of the phenomenon, and so forth.

Note that, in the case in which the display device 62 has a touch screen function, the selected area mentioned above could be a predetermined area centered on a finger, a pen, or the like that is brought into contact with the display device 62 or an area in which the boundary thereof is drawn by using a finger, a pen, or the like.

Note that, in the case in which the display device 62 is a head-mounted display or glasses with an AR function, the display device 62 may be provided with a line-of-sight detecting device that detects the line of sight of a wearer. In this case, it is possible for the line-of-sight detecting device to serve as the input unit of the augmented reality apparatus 60.

Further, when the robot 30 has failed to appropriately perform work on the target objects O, the controller 40 or the augmented reality apparatus 60 may determine that an event has occurred in the sensing system; in that case, the augmented reality apparatus 60 or the controller 40 may display, on the display device 62 or the controller display unit 42, only those AR images that are present within a predetermined area around the position where the event has occurred.

(Displaying Augmented-Reality Image of Execution History in Accordance with Selection)

The augmented reality apparatus 60 has a function for displaying an execution history related to a selected AR image on the display device 62. For example, an image of a target object O corresponding to one AR image 73 or AR image 80 selected from the plurality of AR images 73 and 80 acquired by the detecting device 20 may be displayed on the display device 62 as the execution history in accordance with the operation of the input unit of the augmented reality apparatus 60. It is preferable that the execution history be displayed at a location that does not overlap with the AR images 73 and 80 on the display device 62.

Note that, when the image acquisition by the detecting device 20 and the detecting processing by the control unit 41 are performed, a plurality of candidates that could be target objects O are recognized by the control unit 41. The control unit 41 is capable of saving execution histories that respectively correspond to the candidates in the storage unit 43.

It suffices that the execution history is a result obtained as a result of execution of the sensing system, and may be a measurement result, a detection result, image-acquisition result, or the like.

(Selection and Manipulation of Object)

In addition, the augmented reality apparatus 60, the controller 40, and so forth may perform selection processing of the individual AR images 71-82 displayed on the display device 62 and movement processing of the selected AR images in accordance with an input made by using a predetermined input device.

For example, on the basis of an AR-image manipulating program 63a stored in a storage unit 63 of the augmented reality apparatus 60, the augmented reality apparatus 60 sets one or more of the individual AR images 71-82 to the selected state in accordance with an input made by using the predetermined input device, and changes the positions and orientations of the selected AR images on the display device 62 in accordance with the input made by using the predetermined input device. The augmented reality apparatus 60 may change the settings of parameters being displayed.

When changing the positions and orientations of the AR images 73 of the detected target objects O, it is possible to change only the positions of the AR images 73 manipulated via the predetermined input device, and it is also possible to move the positions of the plurality of AR images 73 by using the same movement distance or corresponding movement distances.

The predetermined input device includes, for example, an input device which is a touch screen, a keyboard, or the like provided in the display device 62.

In addition, the augmented reality apparatus 60 transmits movement information of the AR images 71-82 and/or change information of parameters to the controller 40 on the basis of the input made by using the input device, and the control unit 41 of the controller 40 changes, on the basis of a setting adjusting program 43f stored in the storage unit 43, various types of parameters that are set in the controller 40 or various types of parameters that are calculated in the controller 40, in accordance with the received movement information.

For example, in accordance with the movement information of the AR images 71 or the AR images 74, the sensor coordinate system or the reference coordinate system being recognized by the controller 40 is changed. In the case in which the detecting device 20 has a zoom function, an optical-axis changing function, an orientation changing function, and so forth for changing the detection area, the controller 40 controls these functions of the detecting device 20 in accordance with the movement information of the AR image 72.

In addition, detected positions, orientations, and so forth of some of or all of the target objects O being recognized by the controller 40 are changed in accordance with the movement information of the AR images 73 or the AR images 80. The transfer velocity, the movement amount, and so forth of the individual target objects O being recognized by the controller 40 may be changed in accordance with the movement information of the AR images 73 or the AR images 80. On the other hand, the transfer velocity, the movement amount, and so forth of the target objects O being recognized by the controller 40 may be changed in accordance with the movement information of the AR image 77.

Note that respective data may be changed with respect to the recorded AR images in accordance with respective items of the movement information.

In addition, the controller 40 changes the settings of the work area of the robot 30 in accordance with the movement information of the AR image 75. In addition, the transfer direction of the moving apparatus 10 being recognized by the controller 40 is changed in accordance with the movement information of the AR image 76.

Note that, although the augmented reality apparatus 60 may transmit the movement information to the controller 40 each time the AR images are moved, a configuration in which the movement information is transmitted on the basis of an input made by using the input device is more advantageous in terms of reducing the processing amount, setting error, and so forth of the controller 40.

Note that it is also possible for the control unit 41 to receive the movement information of a certain AR image, and to change, with regard to the AR images that are different from said AR image, various types of parameters that are set in the controller 40 or various types of parameters that are obtained by means of calculations performed in the controller 40. For example, the parameters of the AR images 73, 78, 79, 80, 81, and 82 are changed when the movement information of the AR images 71, 74, and 75, and so forth related to the settings are received. In this case, on the basis of the AR-image creating program 43d, the control unit 41 recreates AR image data on the basis of the parameters that have been changed in the controller 40, and transmits the created AR image data to the display device 62. Accordingly, it is possible for the operator to immediately recognize, when a certain AR image is moved, changes in the settings, calculations, and so forth in the controller 40 associated with the movement of said AR image.

Note that it is also possible to employ a wearable device known as a smart glove as the predetermined input device. In the case in which a smart glove is employed, for example, when the operator places the hand wearing the smart glove in the angle of view of the camera 61, the positions of the index finger, the thumb, and so forth of said hand are recognized by the augmented reality apparatus 60, and, when the operator performs the motion of grabbing one AR image among the AR images 71-82 with the index finger and the thumb, said AR image is set to the selected state and is moved when the index finger and the thumb are moved while being held in that state.

Note that the positions, orientations, parameters, and so forth of the above-described AR images 71-82 are set, for example, by using the reference coordinate system of the robot 30 as the reference. In contrast, the positions, orientations, parameters, and so forth of the AR images 71-82 may be set by using the sensor coordinate system of the detecting device 20 as the reference. In addition, in the case in which the plurality of robots 30 individually have the controllers 40, as a result of displaying the AR images 71-82 on the display device 62 in accordance with the reference coordinate systems being recognized by the respective controllers 40, checking of the suitability of the settings of the reference coordinate systems of the respective robots 30 is facilitated.

In addition, in the case in which the display device 62 has a touch screen function, a line-of-sight detecting function for detecting the line of sight of the operator, or the like, one or more of the plurality of robots 30 may be specified by means of the pointing device, the line-of-sight direction, or the like, and the AR images being recognized by the controller 40 of the specified robot 30 may be displayed.

(Application to Another Work System or Inspection System)

It is also possible to apply configurations which are the same as or similar to those described above to a work system in which the robot 30 performs other types of work on the target objects O, such as cutting, assembly, inspection, and observation. It suffices that the target objects O are objects that can be moved by some kind of moving means, and it is possible to employ a robot that is different from the robot 30 as the moving means. In the case in which the target objects O are vehicle bodies or frames of automobiles and in the case in which said vehicle bodies or frames move by means of engines, motors, wheels, and so forth installed therein, the engines, the motors, the wheels, and so forth serve as the moving means.

The target objects O may be moved by means of a chute on which the target objects O slide down, roll down, or fall down by gravity. In this case, by causing an inclined chute to vibrate by means of a vibrating apparatus, it is possible to smoothly move the target objects O on the chute. In this case, the chute, the vibrating apparatus, and so forth serve as the moving means.

In addition, it is possible to apply configurations that are the same as or similar to those described above to a work system that does not employ a robot, an inspection system, and so forth. Examples of a work system that does not employ a robot include an automatic painting system in which a plurality of paint guns (predetermined apparatuses) are disposed at predetermined positions above the moving apparatus 10, a washing system in which washing nozzles (predetermined apparatuses) are disposed at predetermined positions at sides of the moving apparatus 10, and so forth.

In the case of an inspection system, for example, an inspection sensor (predetermined apparatus) is disposed above the moving apparatus 10 instead of the robot 30, and the controller 40 performs image processing and determination by using image data acquired by the inspection sensor. An inspection illumination apparatus for illuminating the sensing area of the inspection sensor may be provided.

Also, the controller 40 creates AR images of the image processing results, determination results, parameters related thereto, scores corresponding to the parameters, and so forth, and transmits the created AR images to the display device 62. For example, the display device 62 displays AR images of image-processed images of inspection target objects, determination results related to pass/fail of the inspection target objects, parameters related thereto, scores, and so forth. In addition, the display device 62 may display noise images, which are image-processed images of objects other than the inspection target objects, patterns, blemishes, and so forth on the moving apparatus 10, parameters related to the noise images, scores of the noise images, and so forth. With this configuration, it becomes possible for the operator to easily perform the setting of the controller 40, the setting work of the inspection illumination apparatus, and so forth.

As has been described above, with this embodiment, not only the AR images 73 that correspond to the candidate in which the predetermined parameter is equal to or greater than the detection threshold, but also the candidate AR images 80 that correspond to the candidate in which, although the predetermined parameter is less than the detection threshold, the predetermined parameter is equal to or greater than the detection candidate threshold are displayed on the display device. Accordingly, the work for increasing the number of detected targets through a change in the detection thresholds, a change in lighting (illumination) for detection, changes in other settings, and so forth is facilitated, which also facilitates checking of the results after performing the work.

In this embodiment, the candidate AR images 80 are created in a form that is distinguishable from the AR images 73. With this configuration, it is possible for the operator to easily recognize the presence of target objects O corresponding to the candidate AR images 80.

In this embodiment, the AR images 81 of the detection results that accompany the individual candidate AR images 80 are created, and the display device 62 displays the AR images 81 of the detection results together with the respective candidate AR images 80. With this configuration, it becomes possible for the operator to more easily set parameters related to the detecting device 20 on the basis of the detection result that is displayed together with the respective candidate AR images 80.

In this embodiment, in accordance with an input to a predetermined input unit, the display device 62 displays or projects those AR images 73, 81 and/or candidate AR images 80 that are selected from the plurality of the AR images 73, 80, and 81.

Alternatively, the controller 40 may create and record the AR images 71-82 in real time, and the display device 62 may display those AR images selected from a plurality of AR images 71-82 in accordance with an input to a predetermined input unit or establishment of predetermined conditions in the controller 40 or the sensor at or immediately before that point in time of such input to the input unit or such establishment of the conditions.

With this configuration, it is possible for the operator to select the AR images to be displayed by input to the input unit or the condition setting with respect to the controller 40 or the sensor. Accordingly, it becomes possible for the operator to more easily recognize the processing, settings, and so forth of the controller 40 at an arbitrary point in time or at the time of phenomenon (event) occurrence, which is extremely useful for facilitating investigation of the cause of success/failure of the operation of the system and enhancing the capacity utilization of the system.

With this embodiment, in response to an occurrence of a predetermined event, the display device 62 displays those AR images that are present around the position where the predetermined event has occurred, among the plurality of AR images 71-82. With this configuration, displaying the AR images present around the position where the event has occurred allows the operator to more effectively investigate the cause of success/failure in the operation of the system.

In addition, in this embodiment, the augmented reality apparatus 60 performs the selecting processing, in which at least one of the AR images 71-82 displayed on the display device 62 in accordance with an input made by using a predetermined input device is selected, and the movement processing, in which the selected AR image displayed on the display device 62 is moved. Further, the parameters that are set or calculated in the controller 40 to control the robot 30, which is a work machine, are changed in accordance with the movement information of the selected AR image.

With the above configuration, the operator moves the AR image by using the predetermined input device, and in accordance with the movement, the parameters that are set or calculated in the controller 40 are changed. Accordingly, it becomes possible for the operator to intuitively change the settings for controlling the robot 30, which is useful, also for a skilled operator, for enhancing the setting accuracy and the work efficiency of the controller 40.

With this embodiment, the created AR images 71-82 are stored together with the corresponding real-space images. With this configuration, it is possible for the operator to replay the stored AR images 71-82 together with the real-space images, which is extremely advantageous for facilitating checking of the system settings, facilitating setting of the system, and facilitating investigation of causes of success/failure in the operation of the system.

This embodiment is provided with the replaying unit which replays the stored AR images 71-82 or replays the stored AR images 71-82 together with the real-space images. With this configuration, it is possible for the operator to easily replay, by means of the replaying unit, the stored AR images 71-82 at an arbitrary location together with the real-space images. Alternatively, it is possible to perform, on-site, adjustments for enhancing the capacity utilization by replaying the AR images while looking at apparatuses in the real space.

Note that the robot 30, which is an articulated robot, is employed in this embodiment as a work machine. In contrast, it is also possible to employ, as a work machine, a drill-supporting apparatus that moves a tool such as a drill only in top-to-bottom directions by means of a pneumatic cylinder, a hydraulic cylinder, or the like, and it is also possible to employ other types of work machine.

In addition, it is also possible to employ a display device that projects AR images onto the retina of the operator instead of the display device 62. In this case also, the AR images are displayed on the retina of the operator together with the real-space images.

In addition, it is also possible to use, instead of display by means of the display device 62 or together with display by means of the display device 62, a projector (projection apparatus) that projects AR images onto at least one of apparatuses, for example, the moving apparatus 10, the detecting device 20, and the robot 30, and the spaces in real space. Because the AR images are also displayed in real space in this case, it is possible to achieve operational effects that are similar to those described above.

With the projection apparatus, it is also possible to project 3D AR images in real space. For example, by projecting AR images in a work region, it is possible to display information in the work region.

In addition, unlike the case described above, the glasses with an AR function, the head-mounted display, or the like, which is the display device 62, may be provided with a light-transmitting plate or a light-transmitting film that allows the operator wearing such a device to view raw real space. In this case, the light-transmitting plate or the light-transmitting film may be provided with a function for displaying AR image data, and the glasses with an AR function, the head-mounted display, or the like may be provided with a function for projecting AR image data onto the light-transmitting plate or the light-transmitting film. By employing said configuration, because it is possible for the operator to view the AR images on the light-transmitting plate or the light-transmitting film while looking at real space via the display device 62, operational effects that are similar to those described above are achieved.

Regarding positioning between the augmented-reality images on the light-transmitting plate or the light-transmitting film and raw real space, for example, it is possible to employ a method in which the position at which a person is standing or the like is detected by using another sensor and AR images in accordance with the orientation of the person are prepared and displayed.

In the case in which the display device 62 or the projection apparatus is employed, with which it is possible to view the AR images on the light-transmitting plate or the light-transmitting film while looking at real space, it is also possible to perform the above-described "Displaying detection results that do not qualify as work target", the above-described "Displaying augmented-reality image in accordance with selection", and the above-described "Selection and manipulation of object", and the application to another work system or an inspection system is also possible, as described above.

For example, when a motion of grabbing a projected AR image or an AR image displayed on the light-transmitting plate or the light-transmitting film with the index finger and the thumb of a smart glove is performed, said motion is recognized by means of an image acquired by the camera, and said AR image is moved when the index finger and the thumb are moved while being held in that state.

Note that the camera 61 of the augmented reality apparatus 60 may be disposed at a position from which the moving apparatus 10, the detecting device 20, and the robot 30 are overlooked, and the display device 62 may display real-space images and AR images in an overlooking state. In this case, the display device 62 may display an AR image of the operator.

Note that, in this embodiment, although a system in which the controller 40 creates AR images, as described above, has been described, a controller that is built into the augmented reality apparatus 60 or the like or another controller may receive data about various settings, the computation results, the determination results, and so forth from the controller 40, may create AR images by using the received data, and may transmit the created AR image to the display device 62.

In addition, the detecting device 20 may move in accordance with the positions of the target objects O. For example, the detecting device 20 may be supported at a tip portion of the robot 30, and, in this case also, the controller 40 has setting data such as the coordinate system, the detection area, and so forth of the detecting device 20, and is capable of determining, by means of calculations, the position and orientation of the detecting device 20 in accordance with the motions of the robot 30.

Furthermore, the detecting device 20 may be supported by a single-axis robot, an articulated robot, or the like. In such a case, the controller 40 receives the setting data such as the coordinate system, the detection area, and so forth of the detecting device 20, and is capable of determining, by means of calculations, the position and orientation of the detecting device 20 in accordance with the motions of the single-axis robot, the articulated robot, or the like.

Note that the augmented-reality creating unit need not be in the controller.

The following aspects of the present invention are derived from the above disclosure.

A sensing system according to a first aspect of the present invention is provided with: a detecting device that is used to detect a target; a target detecting unit which detects the target by applying predetermined processing to data obtained by the detecting device; an augmented-reality-image creating unit which creates an augmented-reality image corresponding to a candidate in a plurality of candidates that appear in the processed data to which the predetermined processing has been applied, a predetermined parameter of the candidate being equal to or greater than a detection threshold, and which creates a candidate augmented-reality image corresponding to a candidate in the plurality of candidates, the predetermined parameter of the candidate for the candidate augmented-reality image being less than the detection threshold and equal to or greater than a detection candidate threshold; and a display device or a projection apparatus that displays or projects the augmented-reality image and the candidate augmented-reality image.

Hereinafter, there are cases in which the "augmented-reality image" is described as an "AR image".

With this aspect, not only the AR image that corresponds to the candidate in which the predetermined parameter is equal to or greater than the detection threshold, but also the candidate AR image that corresponds to the candidate in which, although the predetermined parameter is less than the detection threshold, the predetermined parameter is equal to or greater than the detection candidate threshold is displayed on the display device. Accordingly, the work for increasing the number of detected targets through a change in the detection thresholds, a change in lighting (illumination) for detection, changes in other settings, and so forth is facilitated, which also facilitates checking of the results after performing the work.

In the above-described aspect, preferably, the candidate augmented-reality image is created in a form that is distinguishable from the augmented-reality image.

With this configuration, it is possible for the operator to easily recognize the presence of the target corresponding to the candidate AR image.

In the above-described aspect, preferably, the augmented-reality-image creating unit creates an augmented-reality image of a detection result accompanying the candidate augmented-reality image, and the display device or the projection apparatus displays or projects the augmented-reality image of the detection result together with the candidate augmented-reality image.

With this configuration, it becomes possible for the operator to more easily set parameters related to the detecting device, on the basis of the detection result that is displayed together with the candidate AR image.

In the above-described aspect, preferably, the display device or the projection apparatus displays or projects the augmented-reality image and/or the candidate augmented-reality image selected from the plurality of augmented-reality images in accordance with an input to a predetermined input unit.

Alternatively, the controller creates and records the augmented-reality images in real time, and the display device displays the augmented-reality image selected from the plurality of augmented-reality images in accordance with the input to the predetermined input unit or establishment of predetermined conditions in the controller or the sensor at or immediately before the point in time of such input to the input unit or such establishment of the conditions.

With this configuration, it is possible for the operator to select the AR image to be displayed by using the input to the input unit or the condition setting with respect to the controller or the sensor. Accordingly, it becomes possible for the operator to more easily recognize the processing, settings, and so forth of the controller at an arbitrary point in time or at the time of phenomenon occurrence, which is extremely useful for facilitating investigation of causes of success/failure of the operation of the system and enhancing the capacity utilization of the system.

In the above-described aspect, preferably, in response to an occurrence of a predetermined event, the display device or the projection apparatus displays or projects the augmented-reality image and/or the candidate augmented-reality image that are present around occurrence of the predetermined event among the plurality of augmented-reality images.

With this configuration, the AR images and/or the candidate AR images present around the position where the event has occurred are displayed, which allows the operator to more effectively investigate the cause of success/failure in the operation of the system.

In the above-described aspect, preferably, the sensing system further includes: an augmented-reality-image manipulating unit which performs selecting processing that selects at least one of the augmented-reality images displayed on the display device or projected by the projection apparatus in accordance with an input made by using a predetermined input device; the augmented-reality-image manipulating unit which performs movement processing that moves the selected augmented-reality image displayed by the display device or projected by the projection apparatus in accordance with the input made by using the predetermined input device, and which changes setting of a parameter being displayed; and a setting adjusting unit which changes, in accordance with movement information or change information of the selected augmented-reality image, a parameter that is set or calculated in a controller to control a work machine.

With this configuration, the operator moves the AR images by using the predetermined input device, and the setting adjusting means changes the parameters that are set or calculated in the controller. Accordingly, it becomes possible for the operator to intuitively change the settings for controlling the work machine, which is useful, also for a skilled operator, for enhancing the setting accuracy and the work efficiency.

In the above-described aspect, preferably, the projection apparatus projects the augmented-reality image and the candidate augmented-reality image onto real space, or the display device displays the augmented-reality image so that the augmented-reality image can be viewed together with a real-space image or a real space.

In the case in which the AR images are projected onto real space, it is possible for the operator to visually recognize the settings, processing, and so forth in the controller in real space, which is suitable for holding a discussion among multiple persons. In the case in which the AR images are displayed on the display device so that the AR images can be viewed together with the real-space images or real space, it is possible for the operator to visually recognize the relationship between the AR images and real space by simply looking at the display on the display device without having to view the entire system. In addition, in the case in which the display device displays the AR images together with the real-space images, it is possible to ascertain the situation even if the operator is not at the work site, which is particularly suitable for system monitoring. Adding the AR images to real space is particularly suitable in the case in which the work is performed while actually looking at the work site.

In the above-described aspect, preferably, a storage unit that stores the created augmented-reality image and/or the created candidate augmented-reality image together with a corresponding real-space image.

With this configuration, the AR images are stored together with the corresponding real-space images. Accordingly, it is possible for the operator to replay the stored AR images together with the real-space images, which is extremely advantageous for facilitating checking of the settings of the system, facilitating setting of the system, and facilitating investigation of causes of success/failure of the operation of the system.

The above-described aspect is provided with, preferably, a replaying unit which replays the augmented-reality image and/or the candidate augmented-reality image stored in the storage unit or replays the augmented-reality image together with the real-space image.

With this configuration, it is possible for the operator to easily replay, by means of the replaying means, the stored AR images at an arbitrary location together with the real-space images.

Alternatively, it is possible to perform, on-site, adjustments for enhancing the capacity utilization by replaying the AR images while looking at the apparatuses in the real spaces.

A work system according to a second aspect of the present invention is provided with the sensing system; and a work machine.

A third aspect of the present invention is an augmented-reality-image displaying method that is employed in a system that performs predetermined processing on data obtained by a detecting device and thereby detects a target, the augmented-reality-image displaying method including: creating an augmented-reality image corresponding to a candidate in a plurality of candidates that appear in the processed data to which the predetermined processing has been applied, a predetermined parameter of the candidate being equal to or greater than a detection threshold, and creating a candidate augmented-reality image that corresponds to a candidate in the plurality of candidates, the predetermined parameter of the candidate for the candidate augmented-reality image being less than the detection threshold and equal to or greater than a detection candidate threshold; and displaying or projecting the augmented-reality image and the candidate augmented-reality image.

A fourth aspect of the present invention is a storage medium that stores a program that is employed in a system that performs predetermined processing on data obtained by a detecting device and thereby detects a target, wherein the program causes a computer to execute: creating an augmented-reality image corresponding to a candidate in a plurality of candidates that appear in the processed data to which the predetermined processing has been applied, a predetermined parameter of the candidate being equal to or greater than a detection threshold, and creating a candidate augmented-reality image that corresponds to a candidate in the plurality of candidates, the predetermined parameter of the candidate for the candidate augmented-reality image being less than the detection threshold and equal to or greater than a detection candidate threshold; and displaying or projecting the augmented-reality image and the candidate augmented-reality image.

The above aspects afford an advantage in that it is possible to facilitate investigation of causes of success/failure of the operation of a system that detects a target, to facilitate checking of the setting of the system or to facilitate setting of the system, to enhance the efficiency of state change recognition, and to simplify system adjustment.

The invention claimed is:

1. A sensing system comprising:
a detecting device that is used to detect two or more targets; and
a processor configured to conduct:
a target detecting process which detects the two or more targets by applying predetermined processing to data obtained by the detecting device; and
an augmented-reality-image creating process which creates an augmented-reality image representing a detected shape of a first target detected by the target detection process in the two or more targets that appear in the processed data to which the predetermined processing has been applied wherein a predetermined parameter of the first target is equal to or greater than a detection threshold, and which creates a candidate augmented-reality image representing a detected shape of a second target detected by the target detection process in the two or more targets wherein the predetermined parameter of the second target is less than the detection threshold and equal to or greater than a detection candidate threshold, and
wherein the sensing system further comprises a display device or a projection apparatus that displays or projects the augmented-reality image and the candidate augmented-reality image.

2. The sensing system according to claim 1, wherein the candidate augmented-reality image is created in a form that is distinguishable from the augmented-reality image.

3. The sensing system according to claim 1, wherein the augmented-reality-image creating process creates an augmented-reality image of a detection result accompanying the candidate augmented-reality image, and
the display device or the projection apparatus displays or projects, respectively, the augmented-reality image of the detection result together with the candidate augmented-reality image.

4. The sensing system according to claim 1, wherein the display device or the projection apparatus displays or projects, respectively, the augmented-reality image and/or the candidate augmented-reality image in accordance with an input to a predetermined input unit.

5. The sensing system according to claim 1, wherein, in response to an occurrence of a predetermined event, the display device or the projection apparatus displays or projects, respectively, the augmented-reality image and/or the candidate augmented-reality image that are present around occurrence of the predetermined event.

6. The sensing system according to claim 1, wherein the processor is further configured to conduct:
a storage process which stores the created augmented-reality image and/or the created candidate augmented-reality image together with a corresponding real-space image.

7. The sensing system according to claim 6, wherein the processor is further configured to conduct:
a replaying process which replays the augmented-reality image and/or the candidate augmented-reality image stored by the storage process or replays the augmented-reality image and/or the candidate augmented-reality image together with the real-space image.

8. The sensing system of claim 1, further comprising a work machine.

9. A sensing system comprising:
a detecting device that is used to detect two or more targets; and
a processor configured to conduct:
a target detecting process which detects the two or more targets by applying predetermined processing to data obtained by the detecting device; and
an augmented-reality-image creating process which creates an augmented-reality image corresponding to a first target in the two or more targets that appear in the processed data to which the predetermined processing has been applied wherein a predetermined parameter of the first target is equal to or greater than a detection threshold, and which creates a candidate augmented-reality image corresponding to a second target in the two or more targets wherein the predetermined parameter of the second target is less than the detection threshold and equal to or greater than a detection candidate threshold, wherein the sensing system further comprises a display device or a projection apparatus that displays or projects the augmented-reality image and the candidate augmented-reality image, and wherein the processor is further configured to conduct:

an augmented-reality-image manipulating process which performs selecting processing that selects at least one of the augmented-reality image and the candidate augmented-reality image displayed on the display device or projected by the projection apparatus in accordance with an input made by using a predetermined input device, wherein the augmented-reality-image manipulating process further performs movement processing that moves the selected augmented-reality image displayed by the display device or projected by the projection apparatus in accordance with the input made by using the predetermined input device, and further changes a setting of a parameter being displayed; and a setting adjusting process which changes, in accordance with movement information or change information of the selected augmented-reality image, a parameter that is set or calculated in a controller to control a work machine.

10. A sensing system comprising:

a detecting device that is used to detect two or more targets; and a processor configured to conduct:

a target detecting process which detects the two or more targets by applying predetermined processing to data obtained by the detecting device; and an augmented-reality-image creating process which creates an augmented-reality image corresponding to a first target in the two or more targets that appear in the processed data to which the predetermined processing has been applied wherein a predetermined parameter of the first target is equal to or greater than a detection threshold, and which creates a candidate augmented-reality image corresponding to a second target in the two or more targets wherein the predetermined parameter of the second target is less than the detection threshold and equal to or greater than a detection candidate threshold, wherein the sensing system further comprises a display device or a projection apparatus that displays or projects the augmented-reality image and the candidate augmented-reality image, and wherein the projection apparatus projects the augmented-reality image onto a real space, and the display device displays the augmented-reality image and the candidate augmented-reality image so that the augmented-reality image and the candidate augmented-reality image are visible together with a real-space image or the real space.

11. An augmented-reality-image displaying method that is employed in a system that performs predetermined processing on data obtained by a detecting device and thereby detects two or more targets, the augmented-reality-image displaying method comprising:

creating an augmented-reality image representing a detected shape of a first target detected in the processed data among the two or more targets that appear in the processed data to which the predetermined processing has been applied, wherein a predetermined parameter of the first target being equal to or greater than a detection threshold, and creating a candidate augmented-reality image that representing a detected shape of a second target detected in the processed data among the two or more targets, wherein the predetermined parameter of the second target is less than the detection threshold and equal to or greater than a detection candidate threshold, and displaying or projecting the augmented-reality image and the candidate augmented-reality image.

12. A non-transitory computer-readable storage medium that stores a program that is employed in a system that performs predetermined processing on data obtained by a detecting device and thereby detects two or more targets, wherein the program causes a computer to execute:

creating an augmented-reality image representing a detected shape of a first target detected in the processed data among the two or more targets that appear in the processed data to which the predetermined processing has been applied, a predetermined parameter of the first target being equal to or greater than a detection threshold, and creating a candidate augmented-reality image that representing a detected shape of a second target detected in the processed data among the two or more targets, wherein the predetermined parameter of the second target is less than the detection threshold and equal to or greater than a detection candidate threshold; and displaying or projecting the augmented-reality image and the candidate augmented-reality image.

13. A sensing system comprising:

a detecting device that is used to detect two or more targets; and a processor configured to conduct:

a target detecting process which detects the two or more targets by applying predetermined processing to data obtained by the detecting device; and an augmented-reality-image creating process which creates an augmented-reality image corresponding to a first target in the two or more targets that appear in the processed data to which the predetermined processing has been applied wherein a parameter related to at least one of orientation of the first target detected by the target detecting process, contrast of the first target detected by the target detecting process, and height of the first target detected by the target detecting process is equal to or greater than a detection threshold, and which creates a candidate augmented-reality image corresponding to a second target in the two or more targets wherein the parameter of the second target is less than the detection threshold and equal to or greater than a detection candidate threshold, and wherein the sensing system further comprises a display device or a projection apparatus that displays or projects the augmented-reality image and the candidate augmented-reality image.

14. An augmented-reality-image displaying method that is employed in a system that performs predetermined processing on data obtained by a detecting device and thereby detects two or more targets, the augmented-reality-image displaying method comprising:

creating an augmented-reality image corresponding to a first target among the two or more targets that appear in the processed data to which the predetermined processing has been applied, wherein a parameter related to at least one of orientation of the first target detected in the processed data, contrast of the first target detected by the target detecting process, and height of the first target in the processed data being equal to or greater than a detection threshold, and creating a candidate augmented-reality image that corresponds to a second target among the two or more targets, wherein the parameter of the second target is less than the detection threshold and equal to or greater than a detection candidate threshold, and displaying or projecting the augmented-reality image and the candidate augmented-reality image.

15. A non-transitory computer-readable storage medium that stores a program that is employed in a system that performs predetermined processing on data obtained by a detecting device and thereby detects two or more targets, wherein the program causes a computer to execute:

creating an augmented-reality image corresponding to a first target among the two or more targets that appear in the processed data to which the predetermined processing has been applied, a parameter related to at least one of orientation of the first target detected in the processed data, contrast of the first target detected by the target detecting process, and height of the first target in the processed data being equal to or greater than a detection threshold, and creating a candidate augmented-reality image that corresponds to a second target among the two or more targets, wherein the predetermined parameter of the second target is less than the detection threshold and equal to or greater than a detection candidate threshold; and displaying or projecting the augmented-reality image and the candidate augmented-reality image.

* * * * *